(12) United States Patent
Izumi et al.

(10) Patent No.: US 12,027,893 B2
(45) Date of Patent: Jul. 2, 2024

(54) POWER SUPPLY DEVICE

(71) Applicant: TOYOTA JIDOSHA KABUSHIKI KAISHA, Toyota (JP)

(72) Inventors: Junta Izumi, Nagoya (JP); Kenji Kimura, Nagoya (JP); Masakazu Habu, Toyota (JP); Hiroshi Tsukada, Nagakute (JP); Atsuhiro Takahashi, Nagakute (JP); Takashi Kojima, Nagakute (JP); Shuji Tomura, Nagakute (JP); Kazuo Ootsuka, Nagakute (JP); Naoki Yanagizawa, Nagakute (JP); Kyosuke Tanemura, Nagakute (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 382 days.

(21) Appl. No.: 17/503,489

(22) Filed: Oct. 18, 2021

(65) Prior Publication Data
US 2022/0123562 A1   Apr. 21, 2022

(30) Foreign Application Priority Data
Oct. 20, 2020   (JP) .................................. 2020-176142

(51) Int. Cl.
*H02J 7/00* (2006.01)
*H01M 10/42* (2006.01)
*H01M 10/44* (2006.01)

(52) U.S. Cl.
CPC ......... *H02J 7/0013* (2013.01); *H01M 10/425* (2013.01); *H01M 10/441* (2013.01); *H01M 2010/4271* (2013.01)

(58) Field of Classification Search
CPC ... H01M 10/425; H01M 10/441; H02J 7/0013
See application file for complete search history.

(56) References Cited

U.S. PATENT DOCUMENTS

| | | | |
|---|---|---|---|
| 2020/0039365 A1* | 2/2020 | Chang | ..................... B60L 50/60 |
| 2020/0169082 A1 | 5/2020 | Yasoshima et al. | |

FOREIGN PATENT DOCUMENTS

| | | |
|---|---|---|
| JP | 2018-074709 A | 5/2018 |
| JP | 2020-089143 A | 6/2020 |
| WO | WO 2018/079664 A1 | 5/2018 |

* cited by examiner

*Primary Examiner* — Robert Grant
(74) *Attorney, Agent, or Firm* — Finnegan, Henderson, Farabow, Garrett & Dunner, LLP

(57) ABSTRACT

A power supply device includes: a first high-voltage line for exchanging the electric power externally; a second high-voltage line for applying current flowing in a direction opposite to the first high-voltage line; a plurality of batteries; a plurality of SUs, the SUs being provided corresponding to the respective batteries, switching a connection state of the batteries to the first high-voltage line, and being disposed in a circle; and an SCU that controls the SUs. The SU can switch between a first state in which the battery corresponding to the SU is connected in series to the first high-voltage line and a second state in which the battery is not connected to the first high-voltage line. The SCU controls the SUs to switch to the first state or the second state in accordance with a voltage of the electric power to be charged and discharged.

7 Claims, 24 Drawing Sheets

POWER SUPPLY DEVICE

CROSS-REFERENCE TO RELATED APPLICATION

This application claims priority to Japanese Patent Application No. 2020-176142 filed on Oct. 20, 2020, incorporated herein by reference in its entirety.

BACKGROUND

1. Technical Field

The present disclosure relates to a power supply device, and more particularly to a power supply device capable of charging and discharging electric power.

2. Description of Related Art

In the related art, there is known a sweep power supply device capable of outputting electric power of a desired output voltage by switching between a state in which a plurality of secondary batteries is connected in series to a power line and a state in which the secondary batteries are not connected (for example, refer to Japanese Unexamined Patent Application Publication No. 2018-74709 (JP 2018-74709 A).

SUMMARY

However, when the area of a closed loop surrounded by the power line is large, radiation in the normal mode becomes large. Therefore, there is a concern that the radiation may affect the surroundings such as malfunction of electronic devices, for example, a control device.

The present disclosure has been made to solve the above-mentioned issue, and an object of the present disclosure is to provide a power supply device capable of reducing an effect of radiation imposed on the surroundings.

A power supply device according to the present disclosure is a power supply device that is able to charge and discharge electric power, and includes: a first power line for exchanging the electric power externally; a second power line for applying current flowing in a direction opposite to the first power line while exchanging the electric power externally; a plurality of secondary batteries; a plurality of switching units, the switching units being provided corresponding to the respective secondary batteries, switching a connection state of the secondary batteries to the first power line, and being disposed in a circle; and a control device that controls the switching units. The switching units are each switchable between a first state in which the secondary battery corresponding to the switching unit is connected in series to the first power line and a second state in which the secondary battery is not connected to the first power line. The control device controls the switching units to switch to the first state or the second state in accordance with a voltage of the electric power to be charged and discharged. One of the first power line and the second power line is disposed side by side with the other between the switching units adjacent to each other.

With this configuration, one of the first power line and the second power line for applying the current in the direction opposite to the first power line is disposed side by side with the other between the switching units adjacent to each other. For this reason, the closed loop surrounded by the power lines can be reduced as compared with the case where the adjacent switching units are connected to each other by only one power line of the outward path and the return path and the other power line extends along another path in which the other power line is not disposed side by side with the one power line, whereby the radiation can be reduced. As a result, the effect of radiation on the surroundings can be reduced.

The switching units adjacent to each other may be connected by the first power line and the second power line. With this configuration, the area of the closed loop surrounded by the power lines can be further reduced as compared with the case where the adjacent switching units are connected by only one of the first power line and the second power line, whereby the radiation can be further be reduced. As a result, the effect of radiation on the surroundings can be further reduced.

The power supply device may further include: a positive electrode power line that connects the switching unit and a positive electrode terminal of the secondary battery corresponding to the switching unit; and a negative electrode power line that connects the switching unit and a negative electrode terminal of the secondary battery corresponding to the switching unit. The switching unit may further include a one-side first terminal for connecting the first power line connected to the switching unit on one adjacent side, an another-side first terminal for connecting the first power line connected to the switching unit on another adjacent side, a positive electrode connection terminal for connecting the positive electrode power line connected to the corresponding secondary battery, a negative electrode connection terminal for connecting the negative electrode power line connected to the corresponding secondary battery, a first electric path that connects the one-side first terminal and the positive electrode connection terminal, a second electric path that connects the other-side first terminal and the negative electrode connection terminal, a bypass electric path that connects the one-side first terminal and the other-side first terminal without passing through the secondary battery, a first switching unit that is provided in the middle of the bypass electric path and opens and closes the bypass electric path, and a second switching unit that is provided in the middle of the first electric path or the second electric path and opens and closes the first electric path or the second electric path. The first state may be a state in which the first switching unit is closed and the second switching unit is opened, and the second state may be a state in which the first switching unit is opened and the second switching unit is closed.

With this configuration, the secondary battery can be connected in series or not connected to the first power line by simply opening and closing the first switching unit and the second switching unit.

The switching unit may further includes: a one-side second terminal for connecting the second power line connected to the switching unit on the one adjacent side; an another-side second terminal for connecting the second power line connected to the switching unit on another adjacent side; and a return electric path that connects the one-side second terminal and the other-side second terminal.

With this configuration, the switching unit including the first and second electric paths through which the current of the first power line flows includes the return electric path through which the current of the second power line flows. Therefore, the area of the closed loop can be further reduced, and the radiation can be further reduced. As a result, the effect of radiation on the surroundings can be further reduced.

The power supply device may further include: a positive electrode reverse power line for applying current flowing in a direction opposite to the positive electrode power line; and a negative electrode reverse power line for applying current flowing in a direction opposite to the negative electrode power line. The positive electrode power line and the positive electrode reverse power line may be disposed side by side with each other. The negative electrode power line and the negative electrode reverse power line may be disposed side by side with each other.

With this configuration, the positive electrode reverse power line and the negative electrode reverse power line for applying the current flowing in the opposite direction are connected so as to be disposed side by side with the positive electrode power line and the negative electrode power line connecting the switching unit and the secondary battery, respectively. Therefore, the area of the closed loop can be further reduced, and the radiation can be further reduced. As a result, the effect of radiation on the surroundings can be further reduced.

The positive electrode power line and the positive electrode reverse power line may be configured by a shielded wire including the positive electrode power line and the positive electrode reverse power line as core wires. With this configuration, the shield of the shielded wire serves as the return line of the positive electrode power line and the positive electrode reverse power line, whereby the common components of the positive electrode power line and the positive electrode reverse power line can be returned to the ground. Therefore, the radiation can be further reduced. As a result, the effect of radiation on the surroundings can be further reduced.

The first power line and the second power line may be twisted together between the switching units adjacent to each other. With this configuration, the radiation can be further reduced. As a result, the effect of radiation on the surroundings can be further reduced.

The switching units adjacent to each other may be connected by a return path line in addition to the first power line and the second power line. With this configuration, the common components of the first power line and the second power line can be returned to the ground by the return path line. Therefore, the radiation can be further reduced. As a result, the effect of radiation on the surroundings can be further reduced.

The switching units adjacent to each other may be connected by a shielded wire including the first power line and the second power line as core wires. With this configuration, the shield of the shielded wire serves as the return line of the first power line and the second power line, whereby the common components of the first power line and the second power line can be returned to the ground. Therefore, the radiation can be further reduced. As a result, the effect of radiation on the surroundings can be further reduced.

According to the present disclosure, a power supply device capable of reducing the effect of radiation on the surroundings can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. In the following description, the same components are designated by the same reference signs. The same applies to names and functions thereof. Therefore, the detailed description of the above will not be repeated.

Figure 1:
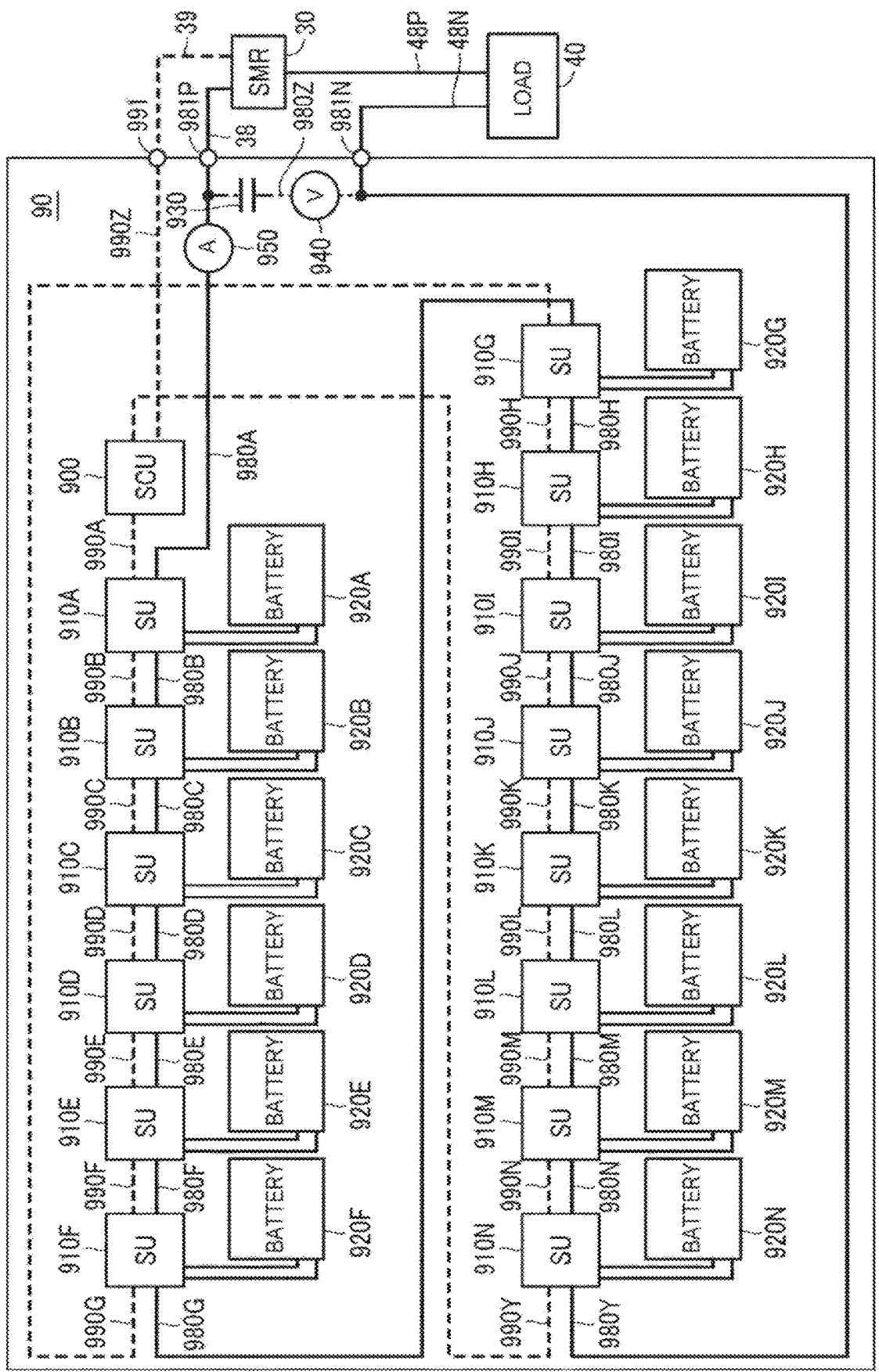
FIG. 1 is a diagram showing the outline of the configuration of a power supply device of the related art.

FIG. 1 is a diagram showing the outline of the configuration of a power supply device 90 of the related art. With reference to FIG. 1, the power supply device 90 is a device that supplies electric power to an external device that consumes the electric power such as a load 40, or stores the electric power from an external electric power source such as a commercial power source or a generator. The power supply device 90 includes sweep units (hereinafter referred to as "SU") 910A to 910N, battery units 920A to 920N, a capacitor 930, a voltage sensor 940, a current sensor 950, and a string control unit (hereinafter referred to as "SCU") 900. A string is a string in which batteries such as secondary batteries are connected in series, and is also called a battery string.

The power supply device 90 is connected to the load 40 via a positive electrode terminal 981P and a negative electrode terminal 981N. A system main relay (SMR) 30 is connected between the positive electrode terminal 981P and the load 40. The positive electrode terminal 981P and the SMR 30 are connected by a power line 38. The SMR 30 and the load 40 are connected by a power line 48P. The negative electrode terminal 981N and the load 40 are connected by a power line 48N.

The SUs 910A to 910N respectively switch whether the battery units 920A to 920N are connected in series to a power line including high-voltage lines 980A to 980Y. The SUs 910A to 910N are connected to the battery units 920A to 920N, respectively by high-voltage lines through which high voltage current can flow. In the present embodiment, the number of combinations of the SU and the battery unit is 14. However, the number of combinations is not limited to this and only needs to be a plural number. Further, "A" to "N" at the end of the reference sips respectively indicate that the configurations are related to the SUs 910A to 910N or the battery units 920A to 920N.

The SU 910B is connected to the adjacent SU 910A by the high-voltage line 980B through which high voltage current can flow. Similarly, the SUs 910C to 910N are connected to the adjacent SUs 910B to 910M by the high-voltage lines 980C to 980N, respectively. The SU 910A is connected to the positive electrode terminal 981P of the power supply device 90 by the high-voltage line 980A on the opposite side of the high-voltage line 980B connected to the SU 910B. The current sensor 950 that measures the current flowing through the high-voltage line 980A is connected in series in the middle of the high-voltage line 980A. The SU 910N is connected to the negative electrode terminal 981N of the power supply device 9W by the high-voltage line 980Y on the opposite side of the high-voltage line 980N connected to the SU 910M. The high-voltage lines 980A and 980Y are connected by the high-voltage line 980Z. The capacitor 930 that smoothens the voltage between the high-voltage lines 980A and 980Y and the voltage sensor 940 that measures the voltage between the high-voltage lines 980A and 980Y are connected in series in the middle of the high-voltage line 980Z.

The SCU 900 controls the SUs 910A to 910N. Specifically, the SCU 900 receives information on the temperature, voltage, and the like of the battery units 920A to 920N from the SUs 910A to 910N via control lines 990A to 990Y for transmitting control signals, and also receives information indicating the voltage and current from each of the voltage sensor 940 and the current sensor 950. The SCU 900 transmits signals for controlling the SUs 910A to 910N using the information above. Further, the SCU 900 transmits a signal for controlling the SMR 30 via the control line 990Z, a control terminal 991, and the control line 39. Here, the control lines 990A to 990Z and the control line 39 are local area network (LAN) cables. However, the control lines 990A to 990Z and the control line 39 may be other well-known types of communication media such as wireless LAN. Further, the communication protocol may be any well-known protocol.

The SU 910B is connected to the adjacent SU 910A by the control line 990B. Similarly, the SUs 910C to 910N are connected to the adjacent SUs 910B to 910M by the control lines 990C to 990N, respectively. The SU 910A is connected to the SCU 90) by the control line 990A. The SU 910N is connected to the SCU 900 by the control line 990Y on the opposite side of the control line 990N connected to the SU 910M.

Figure 2:
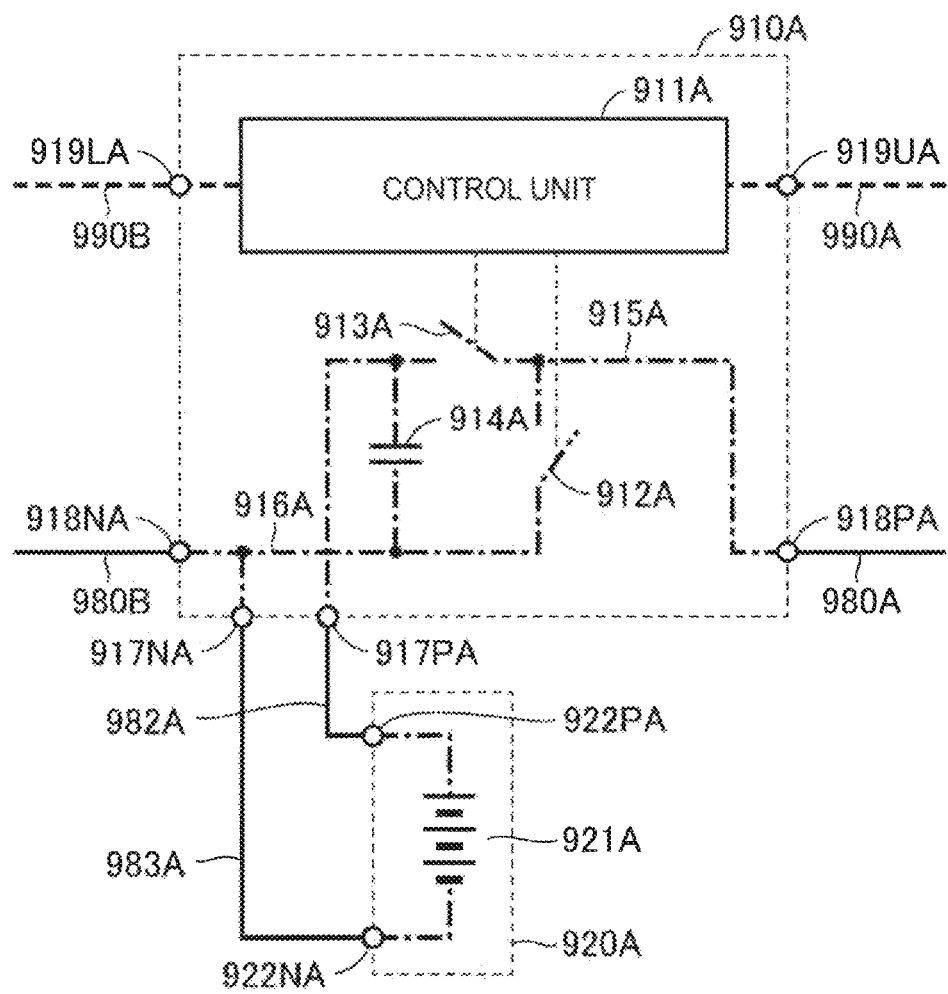
FIG. 2 is a diagram showing the outline of the configuration of a sweep unit (SU) of the power supply device of the related art.

FIG. 2 is a diagram showing the outline of the configurations of the SUs 910A to 910N of the power supply device 90 of the related art. The SUs 910A to 910N have the same configuration. Therefore, with reference to FIG. 2, the SU 910A will be described as a representative. Further, the battery units 920A to 920N have the same configuration. Therefore, the battery unit 920A will be described as a representative.

The battery unit 920A includes a battery 921A. The battery 921A is a secondary battery, for example, a lithium ion battery. The battery unit 920A includes a positive electrode terminal 922PA to which the positive electrode of the battery 921A is connected and a negative electrode terminal 922NA to which the negative electrode of the battery 921A is connected.

The SU 910A includes a control unit 911A, a first switching element 912A, a second switching element 913A, and a capacitor 914A.

In the present embodiment, the first switching element 912A and the second switching element 913A are metal oxide semiconductor field effect transistors (MOS-FET), and controlled by the control unit 911A to open and close the electric path. Note that, the first switching element 912A and the second switching element 913A may be other devices (for example, other types of transistors, thyristors, relays) as long as the first and the second switching elements 912A and 913A are controlled by the control unit 911A and can open and close the electric path.

The SU 910A includes a positive terminal 918PA and a negative terminal 918NA. The positive terminal 918PA and the negative terminal 918NA are terminals for connecting the high-voltage line that is connected to another SU such as the SU 9108, or connected to the positive electrode terminal 981P and the negative electrode terminal 981N of the power supply device 90.

The SU 910A includes a battery positive electrode connection terminal 917PA and a battery negative electrode connection terminal 917NA. The battery positive electrode connection terminal 917PA and the battery negative electrode connection terminal 917NA are terminals for connecting the high-voltage lines 982A and 983A connected to the positive electrode terminal 922PA and the negative electrode terminal 922NA of the battery unit 920A, respectively.

An electric path 915A connects from the positive terminal 918PA to the battery positive electrode connection terminal 917PA. An electric path 916A connects from the middle of the electric path 915A to the negative terminal 918NA and the battery negative electrode connection terminal 917NA. The electric path 915A and the electric path 916A are connected to each other by the capacitor 914A.

The first switching element 912A is connected between a connection point of the electric path 916A with the electric path 915A and a connection point of the electric path 916A with the capacitor 914A. Further, the first switching element 912A is connected to the control unit 911A by a control line.

The second switching element 913A is connected between a connection point of the electric path 915A with the electric path 916A and a connection point of the electric path 915A with the capacitor 914A. Further, the second switching element 913A is connected to the control unit 911A by a control line.

The control unit 911A is connected to control line connection terminals 919UA and 919LA. The control line connection terminals 919UA and 919LA are terminals for connecting the control line to be connected to another SU such as the SU 910B or the SCU 900.

The battery positive electrode connection terminal 917PA of the SU 910A and the positive electrode terminal 922PA of the battery unit 920A are connected by the high-voltage line 982A. The battery negative electrode connection terminal 917NA of the SU 910A and the negative electrode terminal 922NA of the battery unit 920A are connected by the high-voltage line 983A.

When the first switching element 912A and the second switching element 913A are turned on at the same time, this causes a short-circuit state. Therefore, when one of the first switching element 912A and the second switching element 913A is turned on, the other is turned of.

When the first switching element 912A is on and the second switching element 913A is off, the positive terminal 918PA and the negative terminal 918NA are connected without passing through the battery 921A. That is, when the battery 921A is not connected to the high-voltage lines 980A and 980B, the electric power of the battery 921A cannot be exchanged externally of the SU 910A.

Figure 3:
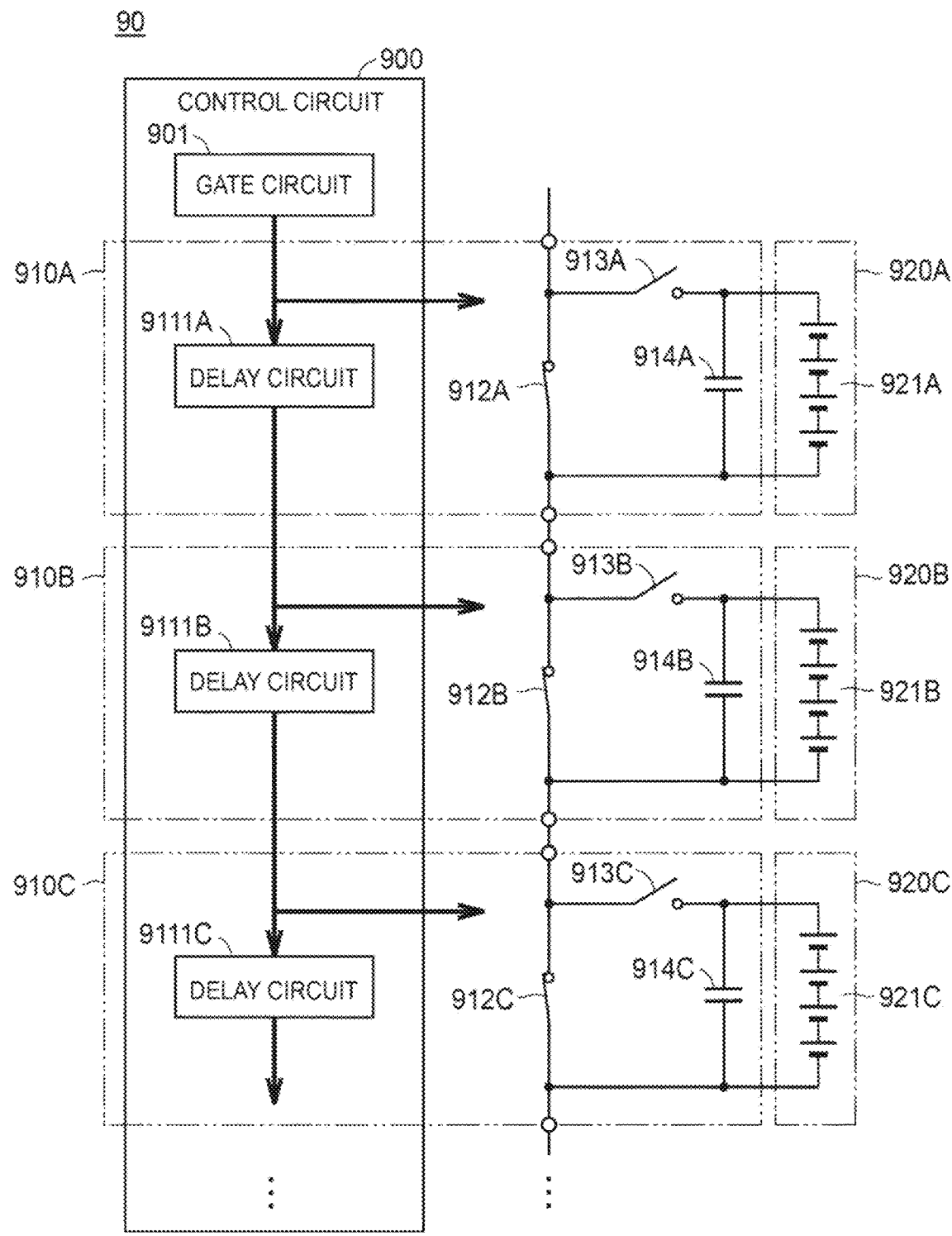
FIG. 3 is a diagram for explaining control of the SUs in the power supply device of the related art.

When the first switching element 912A is off and the second switching element 913A is on, the positive terminal 918PA and the negative terminal 918NA are connected through the battery 921A. That is, when the battery 921A is connected in series to the high-voltage lines 980A and 980B, the electric power of the battery 921A can be exchanged externally of the SU 910A, FIG. 3 is a diagram for explaining the control of the SUs 910A to 910N in the power supply device 90 of the related art. As the control of the SUs 910A to 910N, for example, the same method as the control shown in JP 2018-74709 A can be used. The following control method will be described.

With reference to FIG. 3, the SCU 900 includes a gate circuit 901 and delay circuits 9111A to 9111N (in FIG. 3, the delay circuits 9111A to 9111C are shown). The gate circuit 901 generates a gate signal that is a rectangular wave signal for controlling the first switching elements 912A to 912N and the second switching elements 913A to 913N, and outputs the gate signals to the first SU 910A and to the delay circuit among the delay circuits 9111A to 9111N, that is, the delay circuit 9111A, corresponding to the first SU 910A.

The delay circuits 9111A to 9111M delay the input gate signal for a predetermined delay time and output the gate signal to the SUs 910B to 910N of the next stage, and output the gate signal to the delay circuit of the next stage of the delay circuits 9111B to 9111N. The predetermined delay time is changed in accordance with the input and output voltage of the power supply device 90 and the number of stages of the SUs. Note that, the delay circuits 9111A to 9111N may be provided in the SUs 910A to 910N, respectively.

When the gate signal is input from the gate circuit 901 or the delay circuits 9111A to 9111M, the control units 911A to 911N of the SUs 910A to 910N output the gate signal to the second switching elements 913A to 913N while delaying rising of the input gate signal by a predetermined dead time dt, and output the gate signal to the first switching elements 912A to 912N after the input gate signal is inverted while slightly delaying rising of the inverted gate signal (by predetermined dead time dt).

When the gate signal is input from the gate circuit 901 or the delay circuits 9111A to 9111M, the control units 911A to 911N of the SUs 910A to 910N may output the gate signal to the first switching elements 912A to 912N while delaying rising of the input gate signal by the predetermined dead time dt, and output the gate signal to the second switching elements 913A to 913N after the input gate signal is inverted while slightly delaying rising of the inverted gate signal (by predetermined dead time dt).

The first switching elements 912A to 912N and the second switching elements 913A to 913N are turned on from off when the gate signal rises, while the first switching elements 912A to 912N and the second switching elements 913A to 913N are turned off from on when the gate signal falls.

With this configuration, when the input gate signal rises, the first switching elements 912A to 912N are turned off from on, and after a short time (dead time dt) from rising of the input gate signal, the second switching element 913A to 913N are turned on from off. Further, when the input gate signal falls, the second switching elements 913A to 913N are turned off from on, and after a short time (dead time dt) from falling of the input gate signal, the first switching elements 912A to 912N are turned on from off.

A specific example is shown below. The respective voltages of the batteries 921A to 921N of the battery units 920A to 920N are set to 50 V. The number of combinations of the SUs 910A to 910N and the battery units 920A to 920N included in the power supply device 90 is 14. Therefore, the maximum voltage that the power supply device 90 can output is 50 V×14 sets×700 V.

A period F of the gate signal is set by summing the delay times of the SUs 910A to 910N. Therefore, when the delay time is lengthened, the frequency of the gate signal becomes low. When the delay time is shortened, the frequency of the gate signal becomes high. The delay time of the gate signal can be appropriately set in accordance with the specifications required for the power supply device 90.

The following equation is established: a ratio G1 of an on-time to the period F of the gate signal=the output voltage required for the power supply device 90/the maximum voltage that the power supply device 90 can output. Strictly speaking, because the on-time ratio deviates by the amount of the dead time dt, the on-time ratio is corrected by feedback control or feedforward control.

For example, an example of a case where the output voltage required for the power supply device 90 is 220 V will be described. When it is assumed that the period F of the gate signal is 20 μs (equivalent to 50 kHz), the delay time is 20 μs/14≈1.43 μs (equivalent to 70 kHz). The ratio G1 of the on-time of the gate signal is 220 V/700 V≈0.314.

When the power supply device 90 is operated based on the numerical values above, the output voltage has a rectangular wavy output characteristic that fluctuates between 50 V×4=200 V and 50 V×(4+1)=250 V. The fluctuation cycle of the output voltage is equal to the delay time and is 1.43 μs (equivalent to 70 kHz). In the power supply device 90, many battery units 920A to 920N are connected in series. Therefore, the parasitic inductance of the entire circuit becomes a large value. Therefore, fluctuations in the output voltage are filtered, and the power supply device 90 outputs a substantially constant voltage of 220 V.

However, high frequency current of 50 kHz due to the period F of the gate signal and high frequency current of 700 kHz due to the fluctuation cycle of the output voltage caused by the delay time are superimposed on the high-voltage lines 980A to 980N, in addition to the current from the batteries 921A to 921N. Further, harmonics due to the high frequency currents above are also superimposed. The high frequency currents and harmonics sneak around the control lines 990A to 990N.

Figure 4:
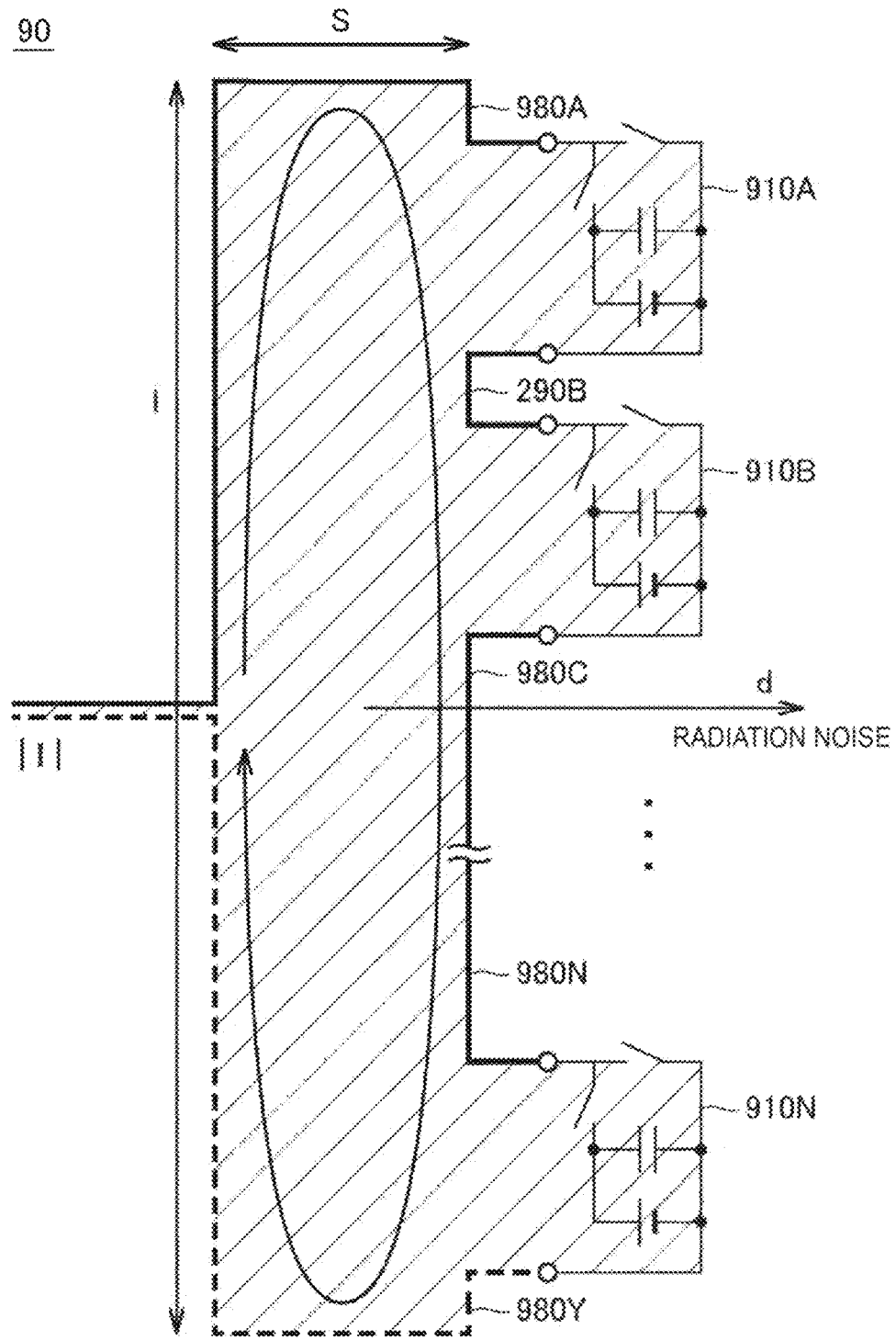
FIG. 4 is a diagram showing the outline of the power supply device of the related art.

FIG. 4 is a diagram showing the outline of the power supply device 90 of the related art. With reference to FIG. 4. FIG. 4 shows the configuration in which the connection states of the high-voltage lines 980A to 980N. 980Y and the SUs 910A to 910N of the power supply device of the related art shown in FIG. 1 are simplified. As shown in FIG. 4, the area of the closed loop configured by the high-voltage lines 980A to 980N, 980Y and the SUs 910A to 910N (the dotted hatched portion in FIG. 4) becomes wide. When the above-mentioned high-frequency current flows in the closed loop, radiation in a normal mode occurs. This is because the closed loop serves as a loop antenna. As the closed loop becomes larger, the radiation in normal mode also becomes larger. An electric field strength Ed (V/m) of the radiation due to the normal mode current is given by the following equation ( ).

Equation 1

$$|E_d| = 1.316 \times 10^{-14} \frac{f^2 I_S[I]}{d} \quad (1)$$

Here, f is the frequency, I×s is the area of the loop, |I| is the current, and d is the distance to the point where the electric field strength Ed is obtained. It can be understood that the electric field strength is proportional to the closed loop area I×s based on the equation (1). Further, an electric field strength Ec (V/m) of the radiation due to the common mode current is given by the following equation (2).

Equation 2

$$|E_C| = 1.257 \times 10^{-6} \frac{f I[I]}{d} \quad (2)$$

In the case of the common mode, the closed loop is not considered as a loop antenna, and is considered as a monopole antenna. The effect of the electric field strength is significantly larger with the radiation due to the common mode current than the radiation due to the normal mode current. However, as the closed loop becomes smaller, the common mode current normally becomes smaller because the outward current and the return current cancel out.

As described above, when the area of the closed loop surrounded by the power line is large, radiations in the normal mode and the common mode become large. Therefore, there is a concern that the radiations may affect the surroundings such as malfunction of electronic devices, for example, a control device.

Therefore, the power supply device 10 includes a high-voltage line on the positive electrode side for exchanging the electric power externally, a high-voltage line on a negative electrode side for applying current flowing in a direction opposite to the high-voltage line on the positive electrode side while exchanging the electric power externally, a plurality of batteries, a plurality of SUs, and an SCU that controls the SUs. The SUs are provided corresponding to the respective batteries, switch the connection state of the batteries to the high-voltage line on the positive electrode side, and are disposed in a circle. The SU can switch between a first state in which the battery corresponding to the SU is connected in series to the high-voltage line on the positive electrode side and a second state in which the battery is not connected to the high-voltage line on the positive electrode side. The SCU controls the SUs to switch to the first state or the second state in accordance with the voltage of the electric power to be charged and discharged. One of the high-voltage line on the positive electrode side and the high-voltage line on the negative electrode side is disposed side by side with the other between the adjacent SUs.

With this configuration, one of the high-voltage line on the positive electrode side and the high-voltage line on the negative electrode side for applying the current flowing in the opposite direction is set to be disposed side by side to the other between the adjacent SUs. For this reason, the closed loop surrounded by the high-voltage lines can be reduced as compared with the case where the adjacent SUs are connected to each other by only one power line of the outward path and the return path and the other power line extends along another path in which the other power line is not disposed side by side with the one power line, whereby the radiation can be reduced. As a result, the effect of radiation on the surroundings can be reduced.

First Embodiment

Figure 5:
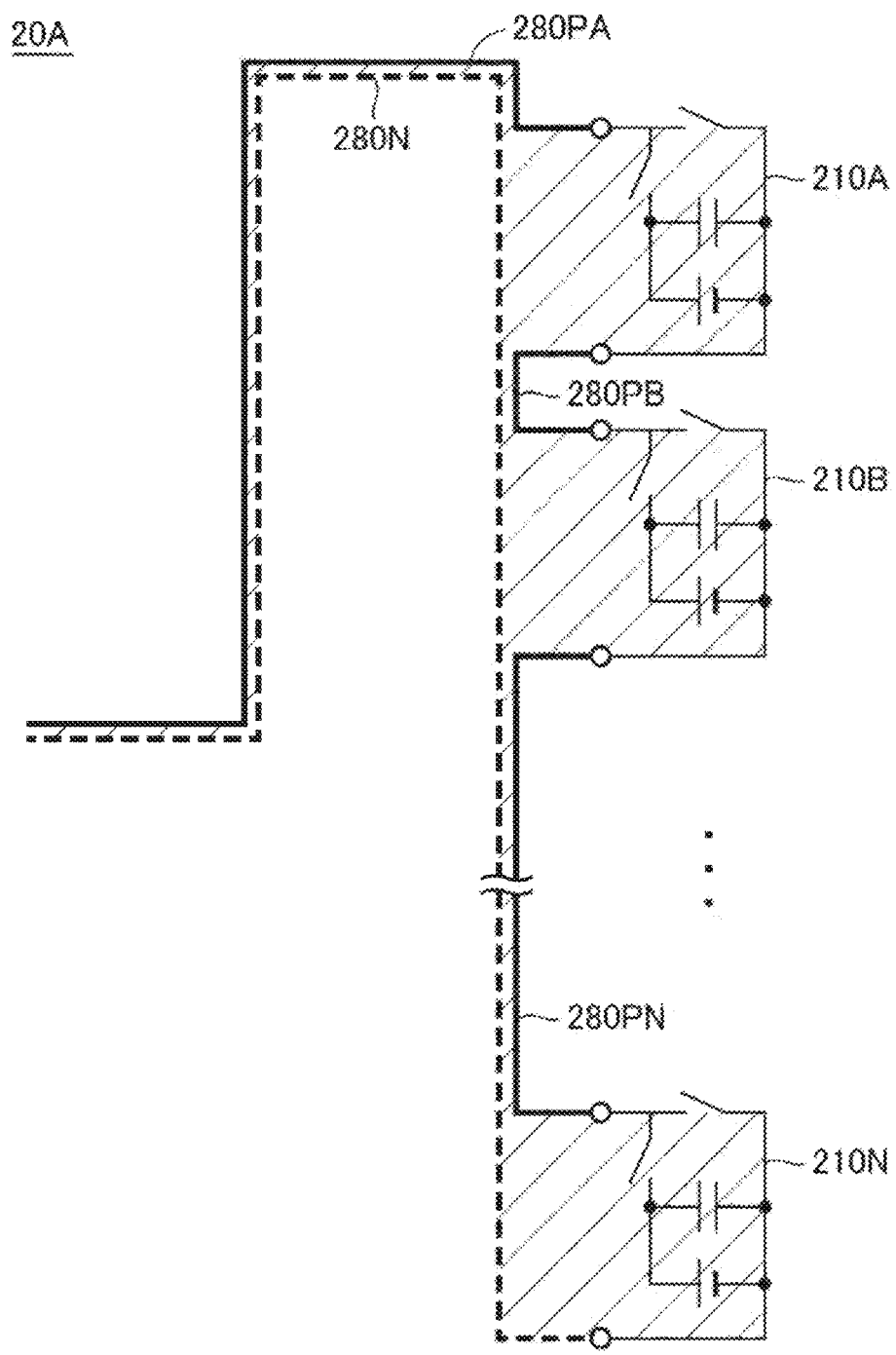
FIG. 5 is a schematic diagram showing the outline of the configuration of a power supply device according to a first embodiment.

FIG. 5 is a schematic diagram showing the outline of the configuration of a power supply device 20A according to a first embodiment. With reference to FIG. 5, the power supply device 20A includes SUs 210A to 210N. In FIG. 5, the batteries of the battery units are also included in the SUs 210A to 210N. The configurations of the SUs 210A to 210N are the same as the configurations of the SUs 910A to 910N of the power supply device 90 of the related art. The control of the SUs 210A to 210N is the same as the control of the SUs 910A to 910N of the power supply device 90 of the related art.

The SUs 210A and 210B are connected by a high-voltage line 280PB on the positive electrode side. Similarly, the SUs 210B to 210M and the SUs 210C to 210N adjacent thereto are connected by high-voltage lines 280PC to 280PN on the positive electrode side, respectively. The positive electrode terminal (not shown) of the power supply device 20A and the SU 210A are connected by a high-voltage line 280PA on the positive electrode side. The negative electrode terminal (not shown) of the power supply device 20A and the SU 210N are connected by a high-voltage line 280N on the positive electrode side.

Each of the high-voltage lines 280PB to 280PN on the positive electrode side that is one of the high-voltage lines 280PB to 280PN on the positive electrode side and the high-voltage line 280N on the negative electrode side is set to be disposed side by side with the high-voltage line 280N on the negative electrode side that is the other between the SUs 210A to 210M and the corresponding SUs 210B to 210N adjacent thereto. In the state in which the high-voltage lines are disposed side by side, for example, the high-voltage lines 280PB to 280PN on the positive electrode side and the high-voltage lines 280N on the negative electrode side come close to each other with the distance therebetween being a predetermined distance or less. The predetermined distance is several centimeters (less than 10 centimeters), preferably several millimeters (less than 10 millimeters). Note that, in the present embodiment, the distance between the two high-voltage lines means the distance between the central axes of the two electric wires. However, the present disclosure is limited to this. The distance between the two high-voltage lines may be the shortest distance between the two electric wires (distance between the outer surfaces of the two electric wires that are the closest to each other).

Note that, in FIG. 5, a portion of the high-voltage line 280PB disposed side by side with the high-voltage line 280N (a portion parallel to the high-voltage line 280N in FIG. 5) and portions of the high-voltage line 280PB connected to the SUs 210A and 210B (portions perpendicular to the high-voltage line 280N in FIG. 5) are shown to be almost the same length. However, in reality, the distance between the SU 210A and the adjacent SU 210B is considerably larger than the length of the portions of the high-voltage line 280PB that are connected to the SUs 210A and 210B (for example, 10 times or more). That is, most of the high-voltage line 280PB on the positive electrode side is disposed side by side with the high-voltage line 280N on the negative electrode side (for example, in a state in which the most of the high-voltage line 280PB comes close to the high-voltage line 280N by a predetermined distance or less). The same applies to the other high-voltage lines 280PC to 280PN on the positive electrode side.

Further, the high-voltage line 280PA on the positive electrode side connected to the positive electrode terminal is also set to be disposed side by side with the high-voltage line 280N on the negative electrode side connected to the negative electrode terminal.

With this configuration, the power supply device 20A according to the first embodiment has the area of the closed loop (the dotted hatched portion in FIG. 5) that is significantly smaller than the area of the closed loop of the power supply device 90 of the related art shown in FIG. 4 (the dotted hatched portion in FIG. 4). For example, the area of the closed loop can be reduced to one-tenth or smaller. When the area of the closed loop can be reduced to x % (0<x<100) as compared with the case of the related art, the electric field strength Ed (V/m) of the radiation due to the normal mode current can be reduced to x %.

Second Embodiment

In the first embodiment, the case where the SUs 210A to 210N are disposed side by side in one stage is schematically shown. In the second embodiment, the SUs 210A to 210N are disposed side by side in two stages.

Figure 6:
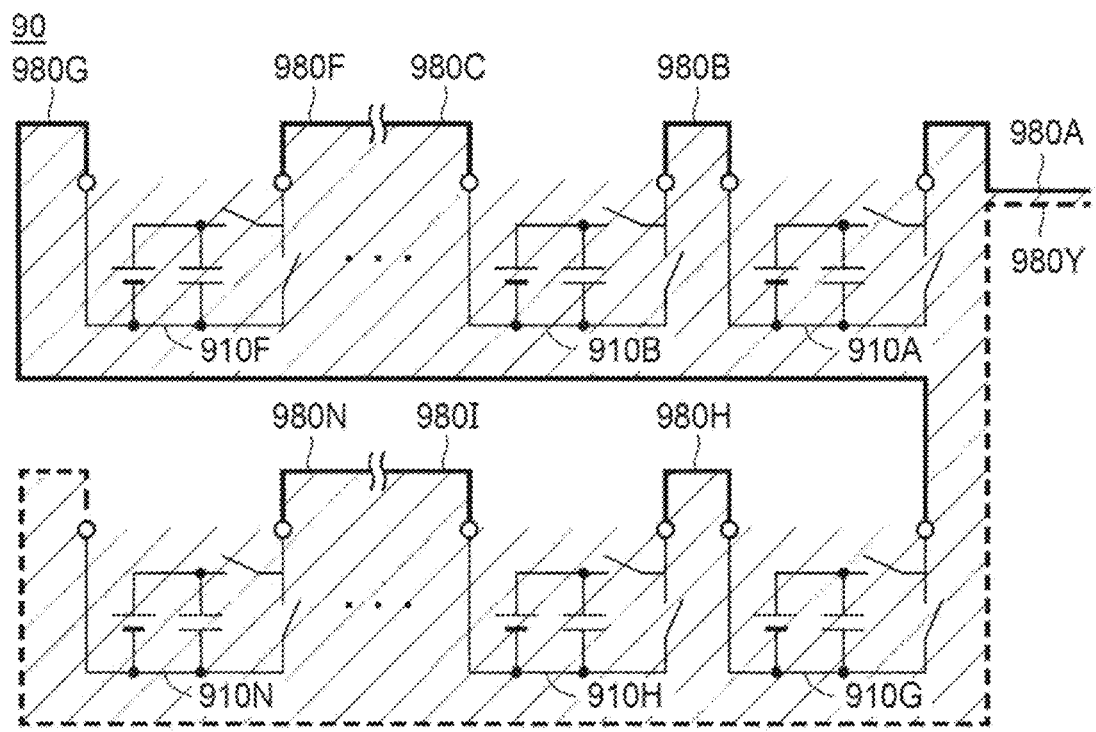
FIG. 6 is a schematic diagram showing the outline of the configuration of the power supply device of the related art.

FIG. 6 is a schematic diagram showing the outline of the configuration of the power supply device 90 of the related art. With reference to FIG. 6, FIG. 6 is a diagram schematically showing the configuration of the power supply device 90 shown in FIG. 1. In FIG. 6, the batteries of the battery units are also included in the SUs 910A to 910N. In FIG. 6, the closed loop of the power supply device 90 is a dotted hatched portion.

Figure 7:
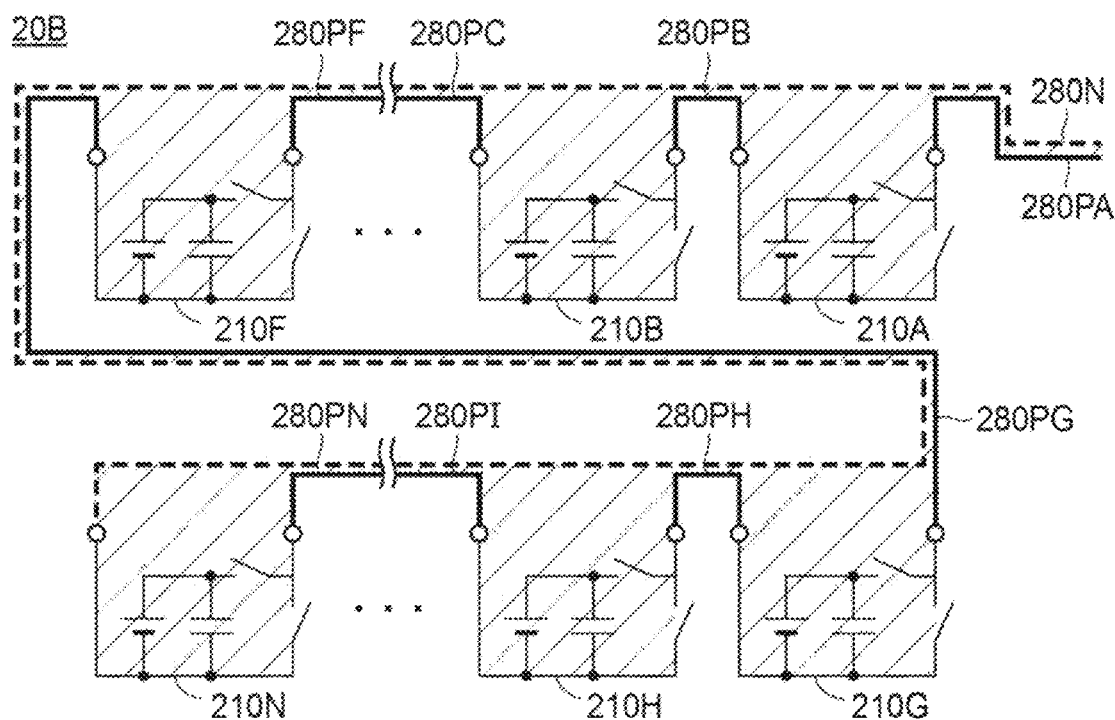
FIG. 7 is a schematic diagram showing the outline of the configuration of a power supply device according to a second embodiment.

FIG. 7 is a schematic diagram showing the outline of the configuration of a power supply device 20B according to a second embodiment. With reference to FIG. 7, as compared with the power supply device 90 of the related art shown in FIG. 6, in the power supply device 20B shown in FIG. 7, each of the high-voltage lines 280PB to 280PN on the positive electrode side or the high-voltage line 280N on the positive electrode side (here, each of the high-voltage lines 280PB to 280PN on the positive electrode side) is set to be disposed side by side with the other (here, the high-voltage line 280N on the negative electrode side) between the SUs 210A to 210M and the corresponding SUs 210E to 210N adjacent thereto, similar to FIG. 5.

Note that, in FIG. 7, a portion of the high-voltage line 280PB disposed side by side with the high-voltage line 280N (a portion parallel to the high-voltage line 280N in FIG. 7) and portions of the high-voltage line 280PB connected to the SUs 210A and 210B (portions perpendicular to the high-voltage line 280N in FIG. 7) are shown to be almost the same length. However, in reality, the distance between the SU 210A and the adjacent SU 210B is considerably larger than the length of the portions of the high-voltage line 280PB that are connected to the SUs 210A and 210B (for example, 10 times or more). That is, most of the high-voltage line 280PB on the positive electrode side is disposed side by side with the high-voltage line 280N on the negative electrode side (for example, in a state in which the most of the high-voltage line 280PB comes close to the high-voltage line 280N by a predetermined distance or less). The same applies to the other high-voltage lines 280PC to 280PN on the positive electrode side.

Further, the high-voltage line 280PA on the positive electrode side connected to the positive electrode terminal is also set to be disposed side by side with the high-voltage line 280N on the negative electrode side connected to the negative electrode terminal.

With this configuration, the power supply device 20B according to the second embodiment has the area of the closed loop (the dotted hatched portion in FIG. 7) that is significantly smaller than the area of the closed loop of the power supply device 90 of the related art shown in FIG. 6 (the dotted hatched portion in FIG. 6). For example, the area of the closed loop can be reduced to one-tenth or smaller.

When the area of the closed loop can be reduced to x % (0<x<100) as compared with the case of the related art, the electric field strength Ed (V/m) of the radiation due to the normal mode current can be reduced to X %.

Third Embodiment

In a third embodiment, as in the second embodiment, the SUs 210A to 210N are separately disposed into two stages. In the third embodiment, a case where the order of connection of the SUs 210A to 210N is different from that of the second embodiment will be described.

Figure 8:
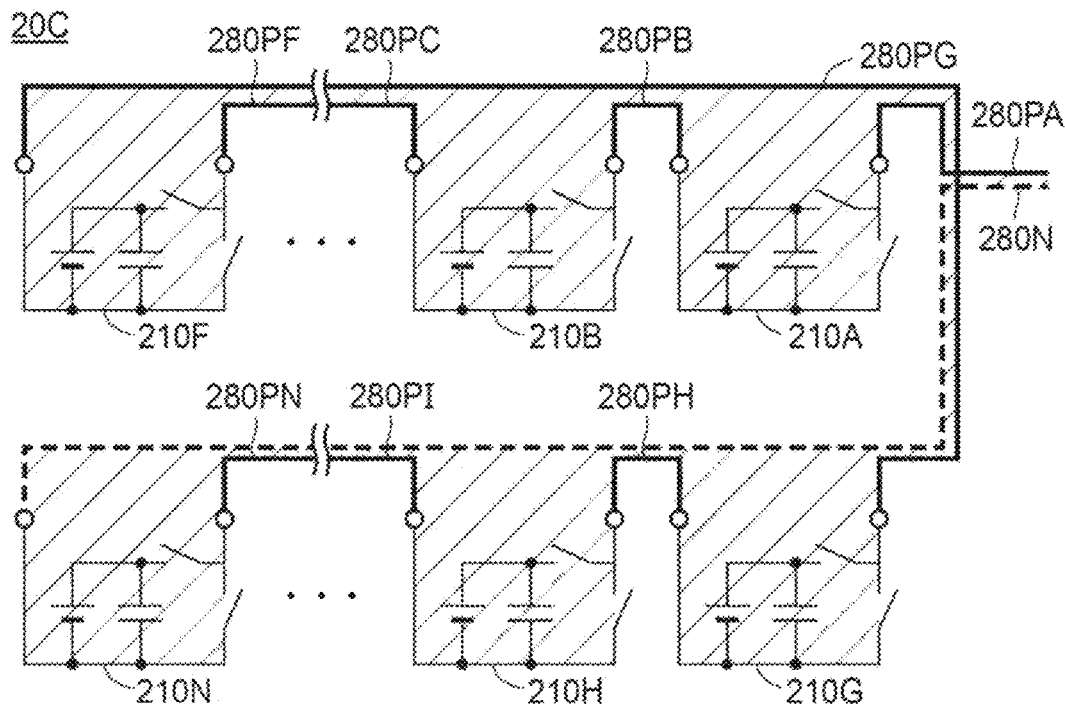
FIG. 8 is a schematic diagram showing the outline of the configuration of a power supply device according to a third embodiment.

FIG. 8 is a schematic diagram showing the outline of the configuration of a power supply device 20C according to the third embodiment. In the second embodiment, as shown in FIG. 7, the SU 210F located at the left end in the upper stage and the SU 210G located at the right end in the lower stage are adjacent to each other. With reference to FIG. 8, in the third embodiment, it is considered that the SU 210F located at the left end in the upper stage and the SU 210G located at the right end in the lower stage are not adjacent to each other, and the upper and lower stages are independent from each other.

In the upper stage, between the SUs 210A to 210E and the SUs 210B to 210F adjacent thereto, each of the high-voltage lines 280PB to 280PF on the positive electrode side or the high-voltage line 280PG on the positive electrode side through which current in the direction opposite to the above voltage lines (here, each of the high-voltage lines 280PB to 280PF on the positive electrode side) is set to be disposed side by side with the other (here, the high-voltage line 280PG on the negative electrode side), similar to FIG. 5.

In the lower stage, between the SUs 210G to 210M and the SUs 210H to 210N adjacent thereto, each of the high-voltage lines 280PH to 280PN on the positive electrode side or the high-voltage line 280N on the negative electrode side through which current in the direction opposite to the above voltage lines (here, each of the high-voltage lines 280PH to 280PN on the positive electrode side) is set to be disposed side by side with the other (here, the high-voltage line 280N on the negative electrode side), similar to FIG. 5.

Note that, in FIG. 8, a portion of the high-voltage line 280PB disposed side by side with the high-voltage line 280PG (a portion parallel to the high-voltage line 280PG in FIG. 8) and portions of the high-voltage line 280PB connected to the SUs 210A and 210B (portions perpendicular to the high-voltage line 280PG in FIG. 8) are shown to be almost the same length. However, in reality, the distance between the SU 210A and the adjacent SU 210B is considerably larger than the length of the portions of the high-voltage line 280PB that are connected to the SUs 210A and 210B (for example, 10 times or more). That is, most of the high-voltage line 280PB on the positive electrode side is disposed side by side with the high-voltage line 280PG on the positive electrode side through which the current in the direction opposite to the high-voltage line 280PB flows (for example, in a state in which the most of the high-voltage line 280PB comes close to the high-voltage line 280PG by a predetermined distance or less). The same applies to the other high-voltage lines 280PG to 280PN on the positive electrode side.

The high-voltage line 280PA on the positive electrode side connected to the positive electrode terminal is also set to be disposed side by side with the high-voltage line 280PG on the positive electrode side through which the current in the direction opposite to the high-voltage line 280PA flows. The high-voltage line 280N on the negative electrode side connected to the negative electrode terminal is also set to be disposed side by side with the high-voltage line 280PG on the positive electrode side through which the current in the direction opposite to the high-voltage line 280N flows.

With this configuration, the power supply device 20C according to the third embodiment has the area of the closed loop (the dotted hatched portion in FIG. 8) that is significantly smaller than the area of the closed loop of the power supply device 90 of the related art shown in FIG. 6 (the dotted hatched portion in FIG. 6). For example, the area of the closed loop can be reduced to one-tenth or smaller. When the area of the closed loop can be reduced to x % (0<x<100) as compared with the case of the related art, the electric field strength Ed (V/m) of the radiation due to the normal mode current can be reduced to x %.

Fourth Embodiment

In the first to third embodiments, the high-voltage lines in the power supply devices 20A to 20C are routed as single electric wires. In the fourth embodiment, the high-voltage lines in the power supply device 10 are routed using parallel two lines.

Figure 9:
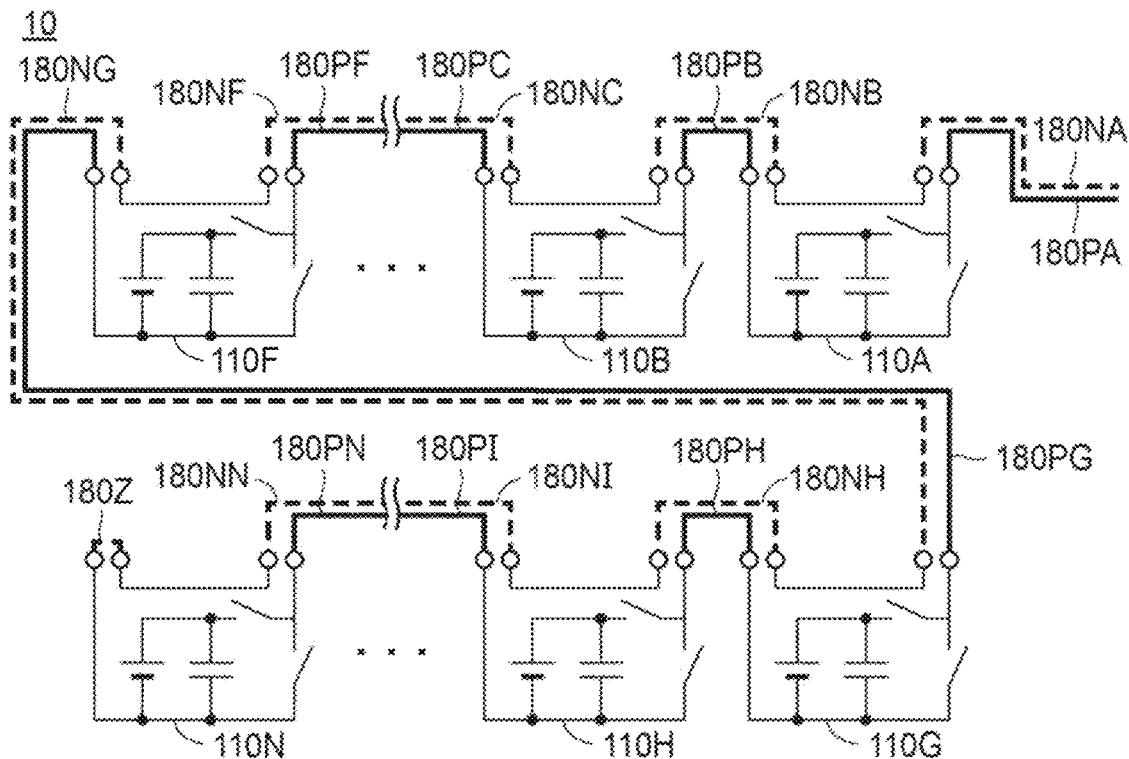
FIG. 9 is a schematic diagram showing the outline of the configuration of a power supply device according to a fourth embodiment.

FIG. 9 is a schematic diagram showing the outline of the configuration of a power supply device 10 according to the fourth embodiment. With reference to FIG. 9, the power supply device 10 includes SUs 110A to 110N. In FIG. 9, the batteries of the battery units are also included in the SUs 110A to 110N. The SUs 110A to 110N include, in addition to the configuration of the SUs 210A to 210N shown in FIG. 5, two terminals for connecting high-voltage lines and an electric path that directly connects the two terminals.

The SU 110A and the SU 110B are connected by a high-voltage line 180PB on the positive electrode side and a high-voltage line 180NB on the negative electrode side. Similarly, the SUs 110B to 110M and the SUs 110C to 110N adjacent thereto are connected by high-voltage lines 180PC to 180PN on the positive electrode side and high-voltage lines 180NC to 180NN on the negative electrode side, respectively. The positive electrode terminal (not shown) of the power supply device 10 and the SU 110A are connected by a high-voltage line 180PA on the positive electrode side. The negative electrode terminal (not shown) of the power supply device 10 and the SU 110A are connected by a high-voltage line 180NA on the negative electrode side. Two terminals of the SU 110N that are not connected to the SU 110M are connected by a high-voltage line 180Z as a termination process.

The combinations of the high-voltage lines 180PA to 180PN and the high-voltage lines 180NA to 180NN are each configured using parallel two electric wires. A stranded electric wire obtained by twisting the two electric wires may be used instead of the parallel two electric wires.

Because parallel two electric wires or a stranded electric wire is used, the high-voltage lines 180PB to 180PN on the positive electrode side and the high-voltage lines 180NB to 180NN on the negative electrode side are disposed side by side with each other (for example, in a state in which high-voltage lines are close to each other by a predetermined distance or less) between the SUs 110A to 110M and the SUs 110B to 110N adjacent thereto. Because parallel two electric wires or a stranded electric wire is used, the predetermined distance is several millimeters (less than 10 millimeters). Further, the high-voltage line 180PA on the positive electrode side and the high-voltage line 180NA on the negative electrode side that are connected to the positive electrode terminal and the negative electrode terminal, respectively, are also set to be disposed side by side with each other (for example, in a state in which high-voltage lines are close to each other by a predetermined distance or less).

Figure 10:
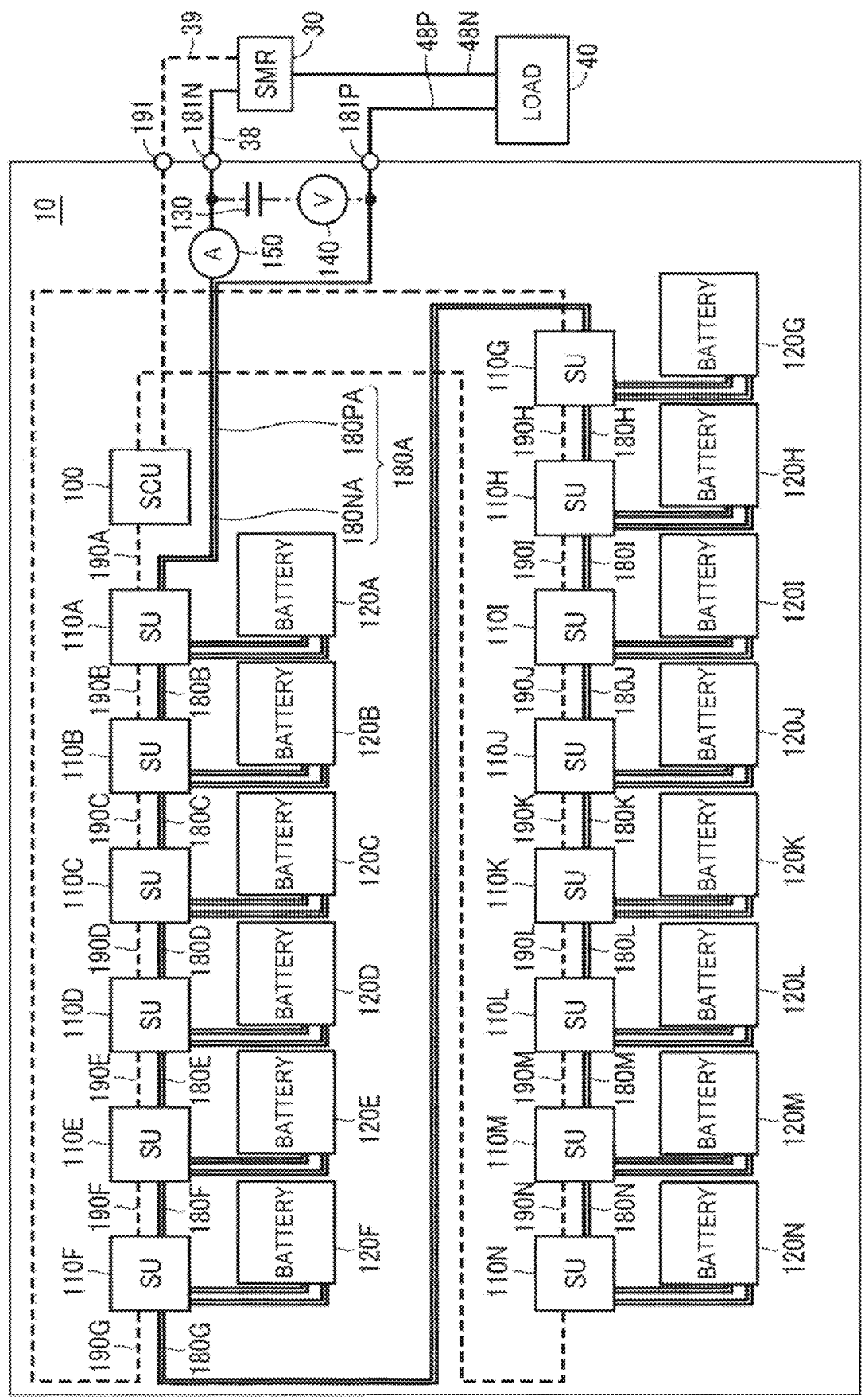
FIG. 10 is a diagram showing a specific example of the outline of the configuration of the power supply device according to the fourth embodiment.

With this configuration, the power supply device 10 according to the fourth embodiment has the area of the closed loop that is significantly smaller than the area of the closed loop of the power supply device 90 of the related art shown in FIG. 4 (the dotted hatched portion in FIG. 4). For example, the area of the closed loop can be reduced to one-tenth or smaller. When the area of the closed loop can be reduced to x % (0<x<100) as compared with the case of the related art, the electric field strength Ed (V/m) of the radiation due to the normal mode current can be reduced to x %, Specific Example of Fourth Embodiment FIG. 10 is a diagram showing a specific example of the outline of the configuration of the power supply device 10 according to the fourth embodiment. With reference to FIG. 10, in the power supply device 9) of the related art shown in FIG. 1, the SUs 910A to 910M and the SUs 9108 to 910N adjacent thereto are connected by high-voltage lines 980B to 980N, each of which is a single electric wire. Meanwhile, in the power supply device 10 according to the fourth embodiment, the SUs 110A to 110M and the SUs 110B to 110N adjacent thereto are connected by the high-voltage lines 180B to 180N, each of which is composed of two electric wires. A positive electrode terminal 181P and a negative electrode terminal 181N of the power supply device 10 and the SU 110A are connected by the high-voltage line 180A composed of two electric wires. The two electric wires consisting the high-voltage line 180A on the positive electrode terminal 181P side and the negative electrode terminal 181N side are separated into the high-voltage lines 180PA and 180NA. A capacitor 130 and a voltage sensor 140 are connected between the high-voltage lines 180PA and 180NA. A current sensor 150 is connected in series to one of the two electric wires of the high-voltage line 180NA.

Figure 11:
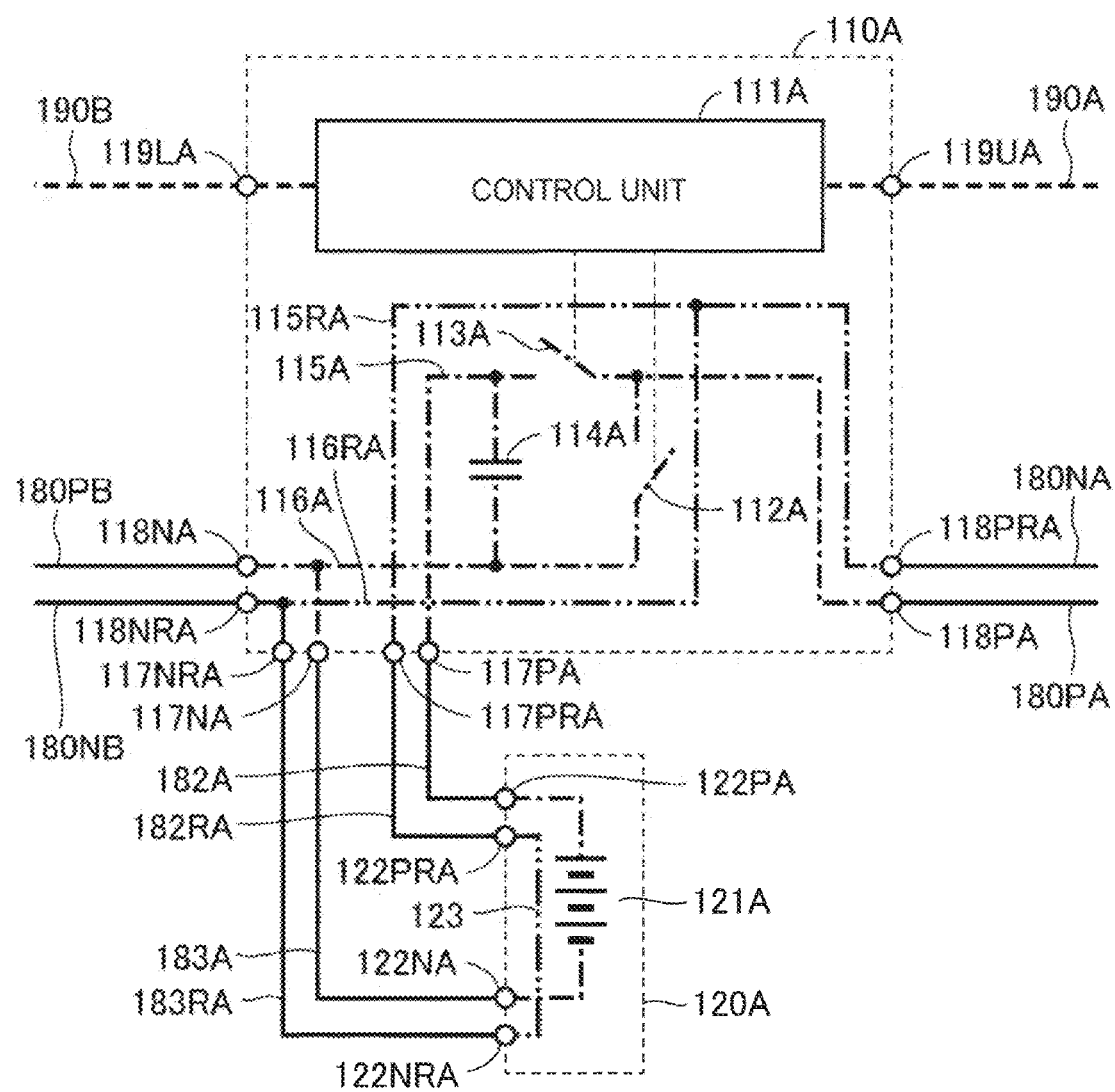
FIG. 11 is a diagram showing the outline of the configuration of the SU of the power supply device according to the fourth embodiment.

FIG. 11 is a diagram showing the outline of the configurations of the SUs 110A to 110N of the power supply device 10 according to the fourth embodiment. The SUs 110A to 110N have the same configuration. Therefore, with reference to FIG. 11, the SU 110A will be described as a representative. Further, battery units 120A to 120N have the same configuration. Therefore, the battery unit 120A will be described as a representative.

The battery unit 120A includes a battery 121A. The battery 121A is a secondary battery, for example, a lithium ion battery. The battery unit 120A includes a return positive electrode terminal 122PRA and a return negative electrode terminal 122NRA in addition to a positive electrode terminal 122PA to which the positive electrode of the battery 121A is connected and a negative electrode terminal 122NA to which the negative electrode of the battery 121A is connected. The return positive electrode terminal 122PRA and the return negative electrode terminal 122NRA are directly connected by an electric path 123 inside the battery unit 120A.

The SU 110A includes a control unit 111A, a first switching element 112A, a second switching element 113A, and a capacitor 114A.

In the present embodiment, the first switching element 112A and the second switching element 113A are MOSFETs and are controlled by the control unit 111A to open and close the electric path. Note that, the first switching element 112A and the second switching element 113A may be other devices (for example, other types of transistors, thyristors, relays) as long as the first and the second switching elements 112A and 113A are controlled by the control unit 111A and can open and close the electric path.

The SU 110A includes a return positive terminal 118PRA and a return negative terminal 118NRA in addition to the positive terminal 118PA and the negative terminal 118NA. The positive terminal 118PA and the negative terminal 118NA are terminals for connecting the high-voltage line on the positive electrode side that is connected to another SU, such as the SU 110B, or connected to the positive electrode terminal 181P of the power supply device 10. The return positive terminal 118PRA and the return negative terminal 118NRA are terminals for connecting the high-voltage line on the negative electrode side that is connected to another SU, such as the SU 110B, or connected to the negative electrode terminal 181N of the power supply device 10.

The SU 110A includes a return battery positive electrode connection terminal 117PRA and a return battery negative electrode connection terminal 117NRA in addition to the battery positive electrode connection terminal 117PA and the battery negative electrode connection terminal 117NA. The battery positive electrode connection terminal 117PA and the battery negative electrode connection terminal 117NA are terminals for connecting high-voltage lines 182A and 183A connected to the positive electrode terminal 122PA and the negative electrode terminal 122NA of the battery unit 120A, respectively. The return battery positive electrode connection terminal 117PRA and the return battery negative electrode connection terminal 117NRA are terminals for connecting high-voltage lines 182RA and 183RA connected to the return positive electrode terminal 122PRA and the return negative electrode terminal 122NRA of the battery unit 120A, respectively.

An electric path 115A connects from the positive terminal 118PA to the battery positive electrode connection terminal 117PA. An electric path 116A connects from the middle of the electric path 115A to the negative terminal 118NA and the battery negative electrode connection terminal 117NA. The electric path 115A and the electric path 116A are connected to each other by the capacitor 114A.

An electric path 115RA connects from the return positive terminal 118PRA to the return battery positive electrode connection terminal 117PRA. An electric path 116RA connects from the middle of the electric path 115RA to the return negative terminal 118NRA and the return battery negative electrode connection terminal 117NRA.

The first switching element 112A is connected between a connection point of the electric path 116A with the electric path 115A and a connection point of the electric path 116A with the capacitor 114A. Further, the first switching element 112A is connected to the control unit 111A by a control line.

The second switching element 113A is connected between a connection point of the electric path 115A with the electric path 116A and a connection point of the electric path 115A with the capacitor 114A. Further, the second switching element 113A is connected to the control unit 111A by a control line.

The control unit 111A is connected to control line connection terminals 119UA and 119LA. The control line connection terminals 119UA and 119LA are terminals for connecting the control line to be connected to another SU, such as the SU 110B, or the SU 100.

The battery positive electrode connection terminal 117PA of the SU 110A and the positive electrode terminal 122PA of the battery unit 120A are connected by the high-voltage line 182A. The return battery positive electrode connection terminal 117PRA of the SU 110A and the return positive electrode terminal 122PRA of the battery unit 120A are connected by the high-voltage line 182RA.

The battery negative electrode connection terminal 117NA of the SU 110A and the negative electrode terminal 122NA of the battery unit 120A are connected by the high-voltage line 183A. The return battery negative electrode connection terminal 117NRA of the SU 110A and the return negative electrode terminal 122NRA of the battery unit 120A are connected by the high-voltage line 183RA.

The combination of the high-voltage lines 182A and 182RA is configured using parallel two electric wires. The combination of the high-voltage lines 183A and 183RA is configured using parallel two electric wires. A stranded electric wire obtained by twisting the two electric wires may be used instead of the parallel two electric wires.

Because parallel two electric wires or a stranded electric wire is used, the high-voltage lines 182A and 182RA and the high-voltage lines 183A and 183RA are disposed side by side with each other (for example, in a state in which high-voltage lines are close to each other by a predetermined distance or less) between the SU 110A and the battery unit 120A. Because parallel two electric wires or a stranded electric wire is used, the predetermined distance is several millimeters (less than 10 millimeters).

Figure 12:
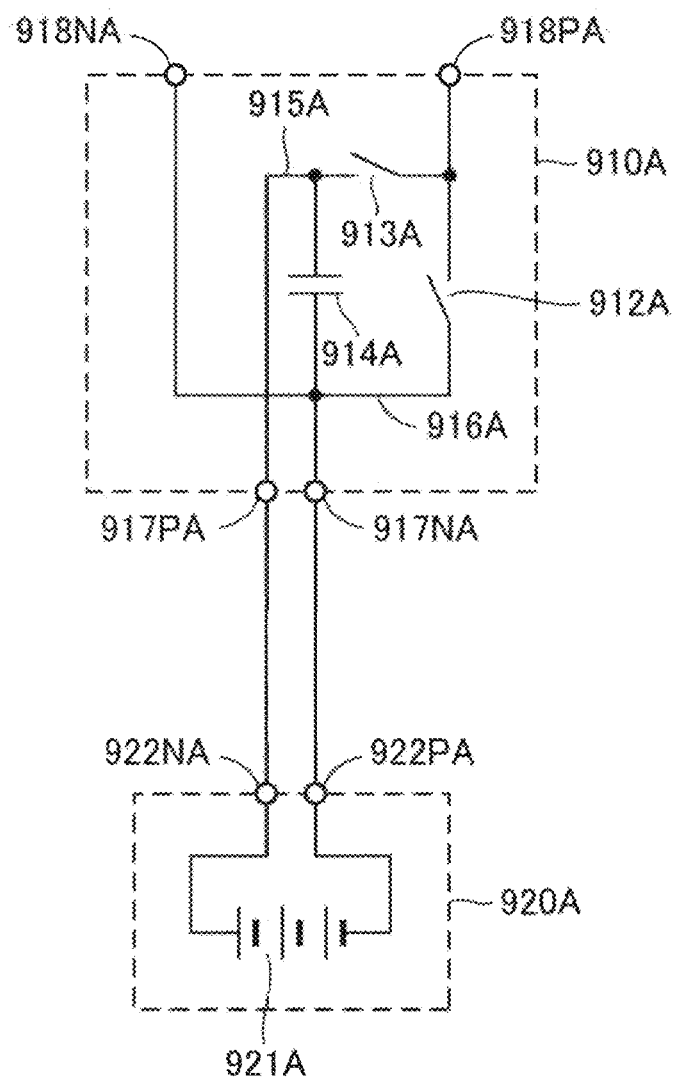
FIG. 12 is a diagram showing a connection between the SU and a battery unit in the power supply device of the related art.

Here, switching between the first switching element 112A and the second switching element 113A will be described. FIG. 12 is a diagram showing a connection between the SU 910A and the battery unit 920A in the power supply device 90 of the related art. With reference to FIG. 12, FIG. 12 shows a rewritten version of the portion of the SU 910A and the battery unit 920A through which the high voltage current flows in the configuration shown in FIG. 2. Therefore, the explanation that overlaps with the explanation with reference to FIG. 2 is not repeated.

Figure 13:
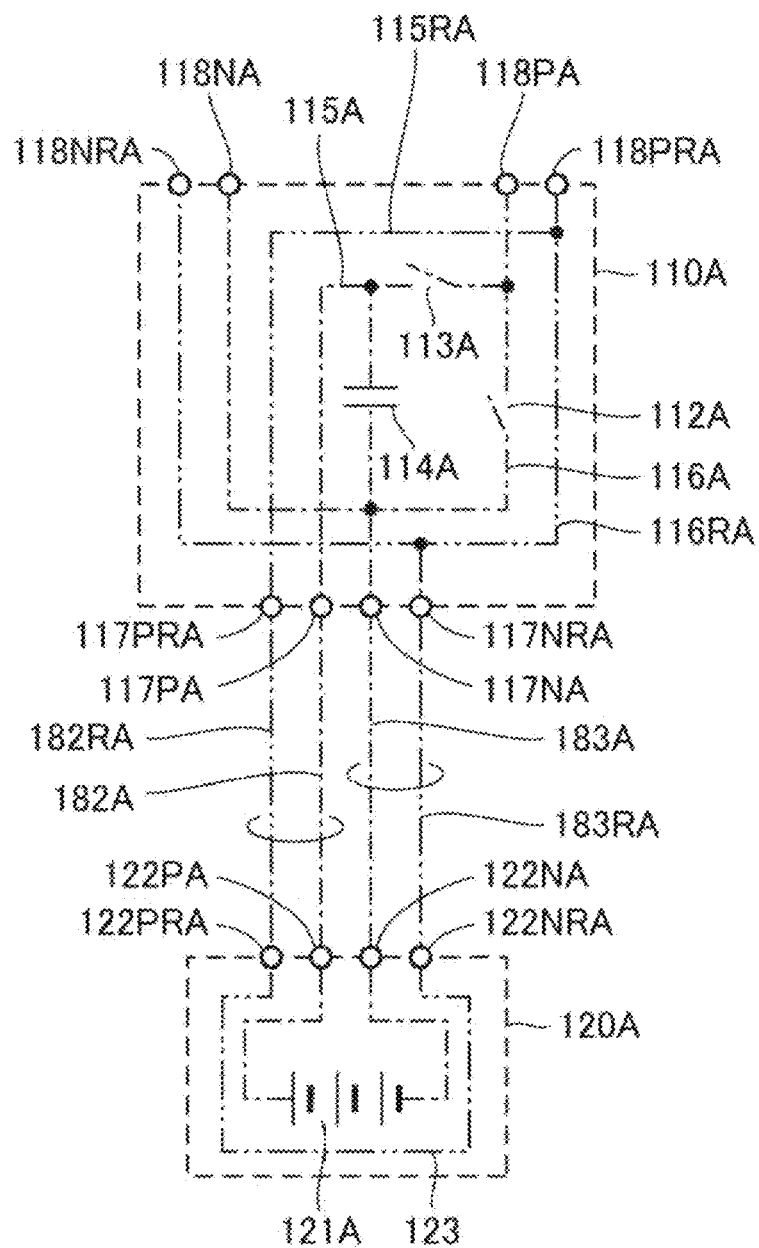
FIG. 13 is a diagram showing a connection between the SU and the battery unit in the specific example according to the fourth embodiment.

FIG. 13 is a diagram showing a connection between the SU 110A and the battery unit 120A in the specific example according to the fourth embodiment. With reference to FIG. 13, FIG. 13 shows a rewritten version of the portion of the SU 110A and the battery unit 120A through which the high voltage current flows in the configuration shown in FIG. 11. Therefore, the explanation that overlaps with the explanation with reference to FIG. 11 is not repeated.

When the first switching element 112A and the second switching element 113A are turned on at the same time, this causes a short-circuit state. Therefore, when one of the first switching element 112A and the second switching element 113A is turned on, the other is turned off.

Figure 14:
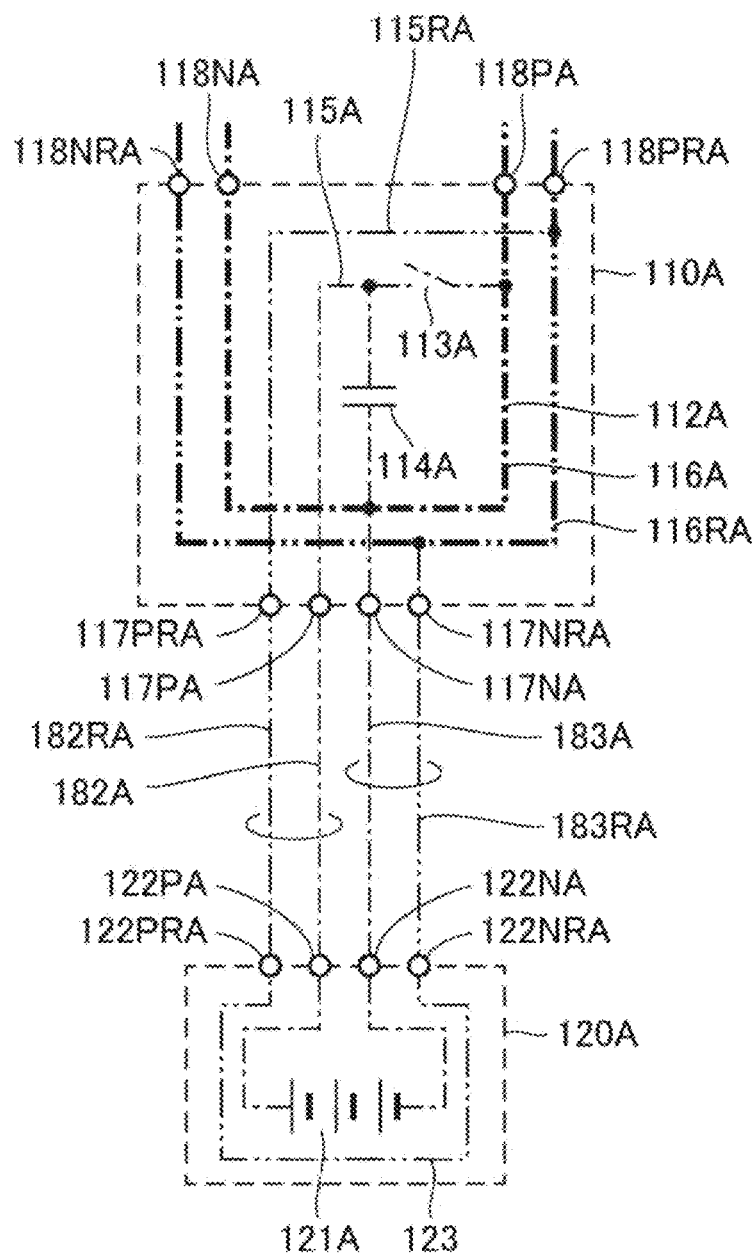
FIG. 14 is a first diagram for explaining switching between a first switching element and a second switching element of the SU in the specific example according to the fourth embodiment.

FIG. 14 is a first diagram for explaining switching between the first switching element 112A and the second switching element 113A of the SU 110A in the specific example according to the fourth embodiment. With reference to FIG. 14, when the first switching element 112A is on and the second switching element 113A is off, the positive terminal 118PA and the negative terminal 118NA are connected without passing through the battery 121A. That is, when the battery 121A is not connected to the high-voltage line 180PA connected to the positive terminal 118PA and the high-voltage line 180PB connected to the negative terminal 118NA, the electric power of the battery 121A cannot be exchanged externally of the SU 110A.

The return positive terminal 118PRA and the return negative terminal 118NRA are directly connected by the electric path 116RA. Therefore, even inside the SU 110A, the electric path 116A and the electric path 116RA in which the currents flow in the opposite direction to each other are set to be disposed side by side with each other.

Figure 15:
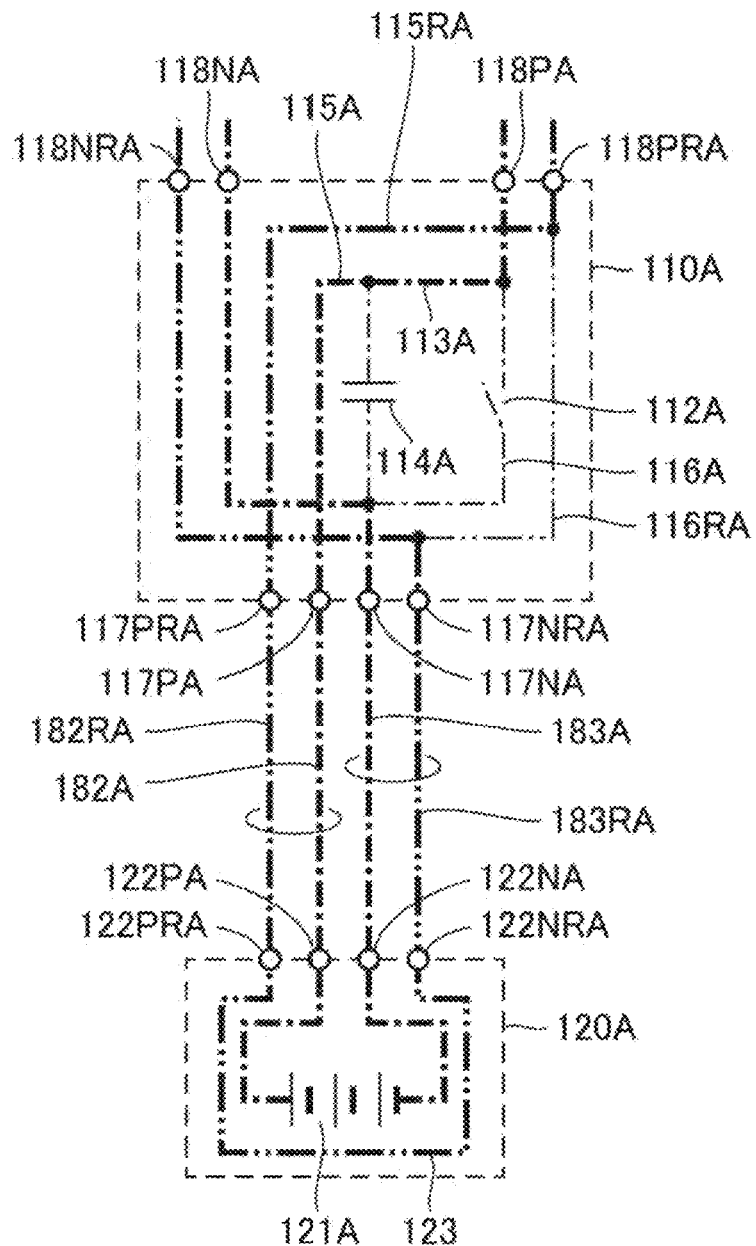
FIG. 15 is a second diagram for explaining switching between the first switching element and the second switching element of the SU in the specific example according to the fourth embodiment.

FIG. 15 is a second diagram for explaining switching between the first switching element 112A and the second switching element 113A of the SC 110A in the specific example according to the fourth embodiment. With reference to FIG. 15, when the first switching element 112A is off and the second switching element 113A is on, the positive terminal 118PA and the negative terminal 118NA are connected while passing through the battery 121A. That is, when the battery 121A is connected in series to the high-voltage line 180PA connected to the positive terminal 118PA and the high-voltage line 180PB connected to the negative terminal 118NA, the electric power of the battery 121A can be exchanged externally of the SU 110A.

The return positive terminal 118PRA and the return negative terminal 118NRA are directly connected to each other by a first electric path in which the electric path 115RA, the high-voltage line 182RA, the electric path 123, the high-voltage line 183RA, and the electric path 116RA are connected in this order. Therefore, even inside the SU 110A and the battery unit 120A, a second electric path in which the electric path 115A that is an electric path passing through the battery 121A, the high-voltage line 182A, the battery 121A, the high-voltage line 183A, and the electric path 116A are connected in this order and the first electric path described above that does not pass through the battery 121A are set to be disposed side by side with each other.

As described above, even inside the SU 110A and the battery unit 120A, the electric paths in which the currents flow in the opposite direction to each other are set to be disposed side by side with each other. Therefore, it is possible to contribute to reduction of the area of the closed loop of the power supply device 10.

Fifth Embodiment

The SU 110F in the fourth embodiment has a long distance from the SU 110G. Therefore, in a fifth embodiment, the SU 110F is connected to the SU 110N.

Figure 16:
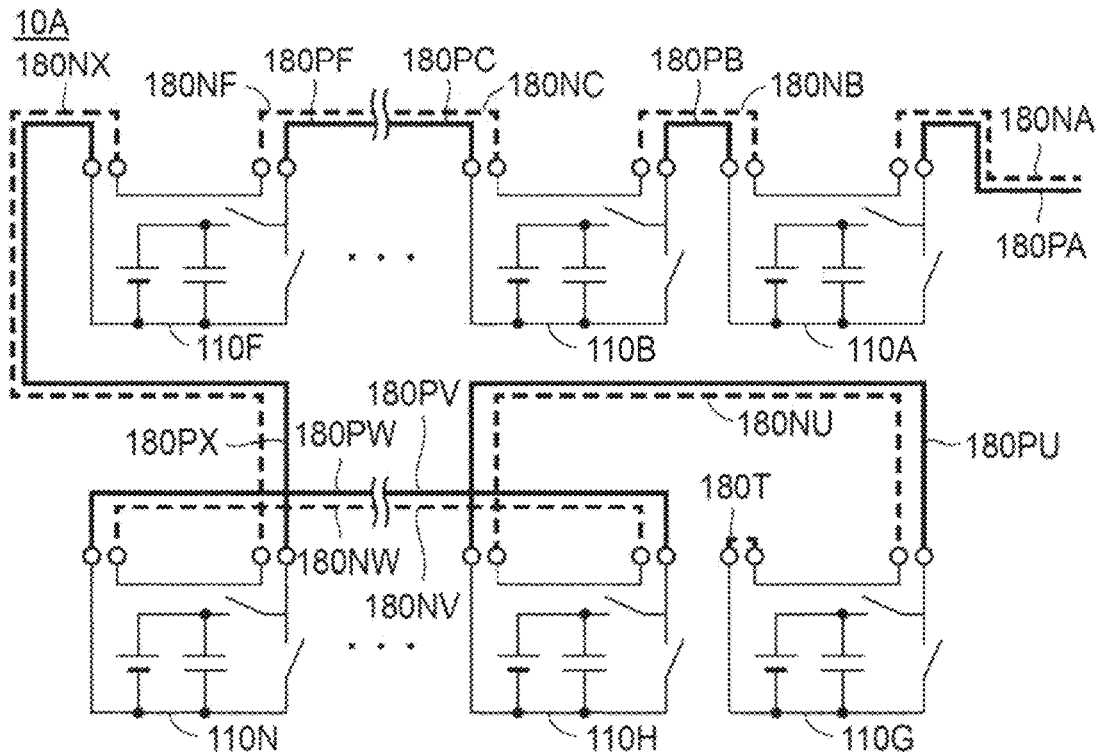
FIG. 16 is a schematic diagram showing the outline of the configuration of a power supply device according to a fifth embodiment.

FIG. 16 is a schematic diagram showing the outline of the configuration of a power supply device 10A according to the fifth embodiment. With reference to FIG. 16, connections of the SUs 110A to 110F are similar to the connections according to the fourth embodiment shown in FIG. 9.

The SU 110F and the SU 110N are connected by a high-voltage line 180PX on the positive electrode side and a high-voltage line 180NX on the negative electrode side. The SU 110N and the SU 110M (not shown) are connected by a high-voltage line 180PW on the positive electrode side and a high-voltage line 180NW on the negative electrode side. The SU 110H (not shown) and the SU 110H are connected by a high-voltage line 180PV on the positive electrode side and a high-voltage line 180NV on the negative electrode side. The SU 110H and the SU 110G are connected by a high-voltage line 180PU on the positive electrode side and a high-voltage line 180NU on the negative electrode side. Two terminals of the SU 110G that are not connected to the SU 110H are connected by a high-voltage line 180T as a termination process.

With this configuration, in addition to the effect of the fourth embodiment, the length of the high-voltage line inside the power supply device 10A can be shortened. Therefore, the area of the closed loop in the power supply device 10A can be further reduced.

Sixth Embodiment

In the fourth embodiment, the high-voltage line in the power supply device 10 is routed using parallel two electric wires. In a sixth embodiment, the high-voltage line in a power supply device 10B is routed using three parallel electric wires.

Figure 17:
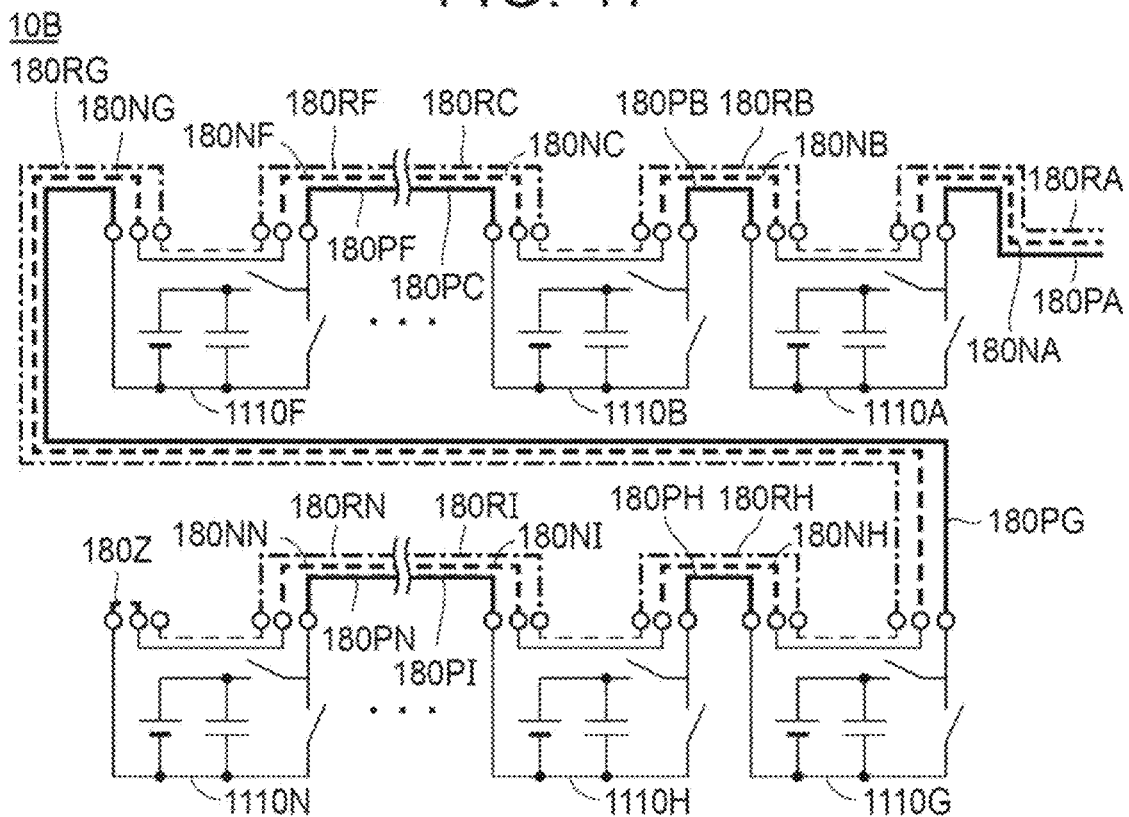
FIG. 17 is a schematic diagram showing the outline of the configuration of a power supply device according to a sixth embodiment.

FIG. 17 is a schematic diagram showing the outline of the configuration of the power supply device 10B according to the sixth embodiment. With reference to FIG. 17, the power supply device 10B includes SUs 1110A to 110N. In FIG. 17, the batteries of the battery units are also included in the SUs 1110A to 1110N. The SUs 1110A to 1110N include, in addition to the configuration of the SUs 210A to 210N shown in FIG. 5, two sets of two terminals for connecting the high-voltage lines and two electric paths that directly connect the two sets of two terminals.

The SU 1110A and the SU 1110B are connected by the high-voltage line 180PB on the positive electrode side, the high-voltage line 180NB on the negative electrode side, and a return path line 180RB. Similarly, the SUs 1110B to 1110M and the SUs 1110C to 1110N adjacent thereto are connected by the high-voltage lines 180PC to 180PN on the positive electrode side, the high-voltage lines 180NC to 180NN on the negative electrode side, and return path lines 180RC to 180RN, respectively. The positive electrode terminal (not shown) and the SU 110A of the power supply device 10B are connected by the high-voltage line 180PA on the positive electrode side. The negative electrode terminal (not shown) and the SU 1110A of the power supply device 10B are connected by the high-voltage line 180NA on the negative electrode side. A ground (not shown) and the SU 1110A of the power supply device 10B are connected by a return path line 180RA. Two terminals of the SU 1110N that are not connected to the SU 1110M are connected by the high-voltage line 180Z as a termination process.

The combinations of the high-voltage lines 180PA to 180PN, the high-voltage lines 180NA to 180NN, and the return path lines 180RA to 180RN are each configured using parallel three electric wires. A stranded electric wire obtained by twisting three electric wires may be used instead of the parallel three electric wires.

Because parallel three electric wires or a stranded electric wire is used, the high-voltage lines 180PB to 180PN on the positive electrode side and the high-voltage lines 180NB to 180NN on the negative electrode side are disposed side by side with each other (for example, in a state in which high-voltage lines are close to each other by a predetermined distance or less) between the SUs 1110A to 1110M and the SUs 1110B to 1110N adjacent thereto. Because the parallel three electric wires or a stranded electric wire is used, the predetermined distance is several millimeters (less than 10 millimeters). Further, the high-voltage line 180PA on the positive electrode side and the high-voltage line 180NA on the negative electrode side that are connected to the positive electrode terminal and the negative electrode terminal, respectively, are also set to be disposed side by side with each other (for example, in a state in which high-voltage lines are close to each other by a predetermined distance or less).

With this configuration, the power supply device 10B according to the sixth embodiment has the area of the closed loop that is significantly smaller than the area of the closed loop of the power supply device 90 of the related art shown in FIG. 4 (the dotted hatched portion in FIG. 4). For example, the area of the closed loop can be reduced to one-tenth or smaller. When the area of the closed loop can be reduced to x % (0<x<100) as compared with the case of the related art, the electric field strength Ed (V/m) of the radiation due to the normal mode current can be reduced to x %.

Further, the current generated by the electric field and the magnetic field generated by the high-voltage lines 180PA to 180PN on the positive electrode side and the high-voltage lines 180NA to 180NN on the negative electrode side flows to the ground through the return path lines 180RA to 180RN. Therefore, radiation due to the closed loop can be weakened.

Seventh Embodiment

In the sixth embodiment, the high-voltage line in the power supply device 10B is routed using three parallel electric wires. Ina seventh embodiment, the high-voltage line in a power supply device 10C is routed using a shielded wire including two core wires.

Figure 18:
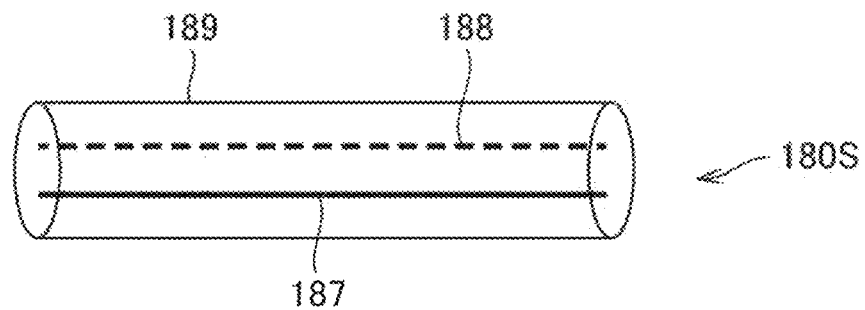
FIG. 18 is a diagram showing the outline of the structure of a shielded wire according to a seventh embodiment.

FIG. 18 is a diagram showing the outline of the structure of a shielded wire 180S according to the seventh embodiment. With reference to FIG. 18, the shielded wire 180S is an electric wire in which high-voltage lines 187 and 188 are covered by a shield composed of metal foil, braid, or the like.

Figure 19:
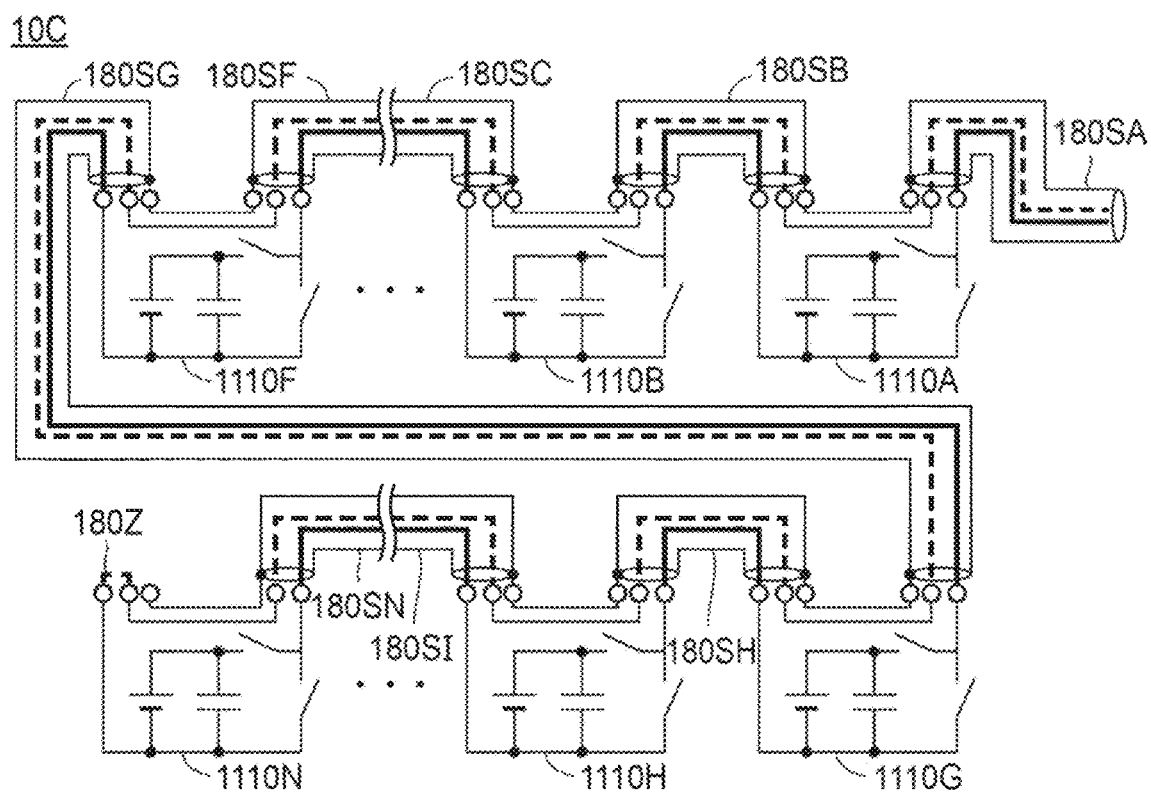
FIG. 19 is a schematic diagram showing the outline of the configuration of a power supply device according to the seventh embodiment.

FIG. 19 is a schematic diagram showing the outline of the configuration of the power supply device 10C according to the seventh embodiment. With reference to FIG. 19, the power supply device 10C includes the SUs 1110A to 1110N FIG. 19, the batteries of the battery units are also included in the SUs 1110A to 1110N. The SUs 1110A to 1110N include, in addition to the configuration of the SUs 210A to 210N shown in FIG. 5, two sets of two terminals for connecting the high-voltage lines and two electric paths that directly connect the two sets of two terminals.

The SU 1110A and the SU 1110B are connected by a shielded wire 180SB. Similarly, the SUs 1110B to 1110M and the SUs 1110C to 1110N adjacent thereto are connected by shielded wires 180SC to 180SN. The positive electrode terminal (not shown) and the negative electrode terminal (not shown) of the power supply device 10C and the SU 1110A are connected by a shielded wire 180SA. Two terminals of the SU 1110N that are not connected to the SU 1110M are connected by the high-voltage line 180Z as a termination process. The shield of any of the shielded wires 180SA to 180SN may be connected to the ground (not shown) of the power supply device 10C.

Because the shielded wires 180SB to 180SN are used, the high-voltage lines on the positive electrode side and the high-voltage lines on the negative electrode side, both included in the shielded wires 180SB to 180SN, are disposed side by side with each other (for example, in a state in which high-voltage lines are close to each other by a predetermined distance or less) between the SUs 1110A to 1110M and the SUs 1110B to 1110N adjacent thereto. Because the shielded wires are used, the predetermined distance is several millimeters (less than 10 millimeters). Further, the high-voltage line on the positive electrode side and the high-voltage line on the negative electrode side that are both included in the shielded wire 180SA and connected to the positive electrode terminal and the negative electrode terminal, respectively, are also set to be disposed side by side with each other (for example, in a state in which high-voltage lines are close to each other by a predetermined distance or less).

With this configuration, the power supply device 10C according to the seventh embodiment has the area of the closed loop that is significantly smaller than the area of the closed loop of the power supply device 90 of the related art shown in FIG. 4 (the dotted hatched portion in FIG. 4). For example, the area of the closed loop can be reduced to one-tenth or smaller. When the area of the closed loop can be reduced to x % (0<, x<100) as compared with the case of the related art, the electric field strength Ed (V/m) of the radiation due to the normal mode current can be reduced to x %.

Further, the electric field and the magnetic field generated by the high-voltage lines on the positive electrode side and the high-voltage lines on the negative electrode side, both included in the shielded wires 180SA to 180SN, are shielded by the shield. Therefore, the radiation due to the closed loop can be weakened.

Eighth Embodiment

In the specific example of the fourth embodiment, as shown in FIG. 11, the combination of the high-voltage line 182A and the high-voltage line 182RA and the combination of the high-voltage line 183A and the high-voltage line 183RA, both connecting the SU 110A and the battery unit 120A, are each composed of two electric wires. In an eighth embodiment, a shielded wire is used instead of the two electric wires.

Figure 20:
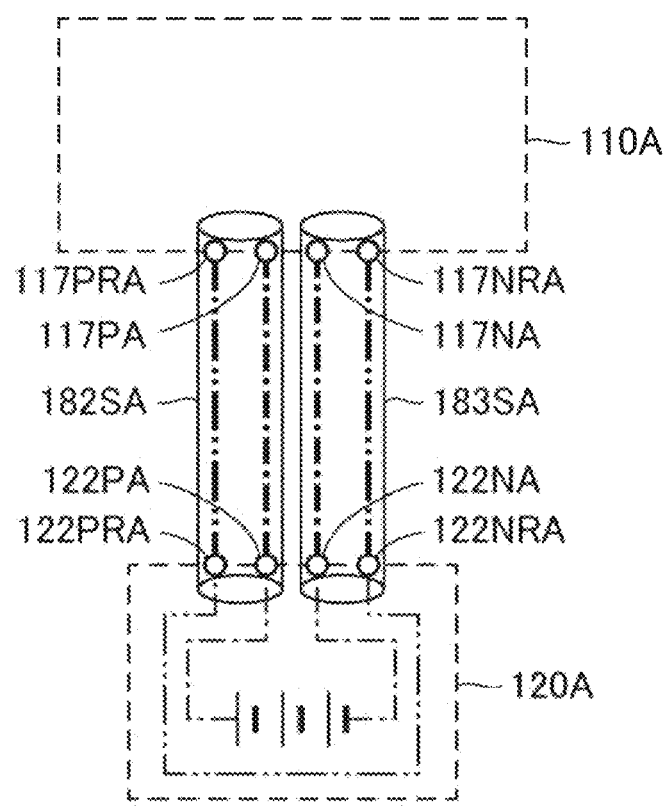
FIG. 20 is a diagram showing a connection between the SU and the battery unit according to an eighth embodiment.

FIG. 20 is a diagram showing a connection between the SU 110A and the battery unit 120A according to the eighth embodiment. With reference to FIG. 20, the battery positive electrode connection terminal 117PA and the return battery positive electrode connection terminal 117PRA of the SU 110A and the positive electrode terminal 122PA and the return positive electrode terminal 122PRA of the battery unit 120A are connected by a shielded wire 182SA.

The battery negative electrode connection terminal 117NA and the return battery negative electrode connection terminal 117NRA of the SU 110A and the negative electrode terminal 122NA and the return negative electrode terminal 122NRA of the battery unit 120A are connected by a shielded wire 183SA. The shields of the shielded wires 182SA and 183SA may be connected to the ground (not shown).

Because the shielded wires 182SA to 183SA are used, the high-voltage lines on the positive electrode side and the high-voltage lines on the negative electrode side, both included in the shielded wires 182SA and 183SA, are disposed side by side with each other (for example, in a state in which high-voltage lines are close to each other by a predetermined distance or less) between the SU 110A and the battery unit 120A. Because the shielded wires are used, the predetermined distance is several millimeters (less than 10 millimeters).

Further, the electric field and the magnetic field generated by the high-voltage lines on the positive electrode side and the high-voltage lines on the negative electrode side, both included in the shielded wires 182SA and 183SA, are shielded by the shield. Therefore, the radiation due to the closed loop can be weakened.

EXAMPLES

Figure 21:
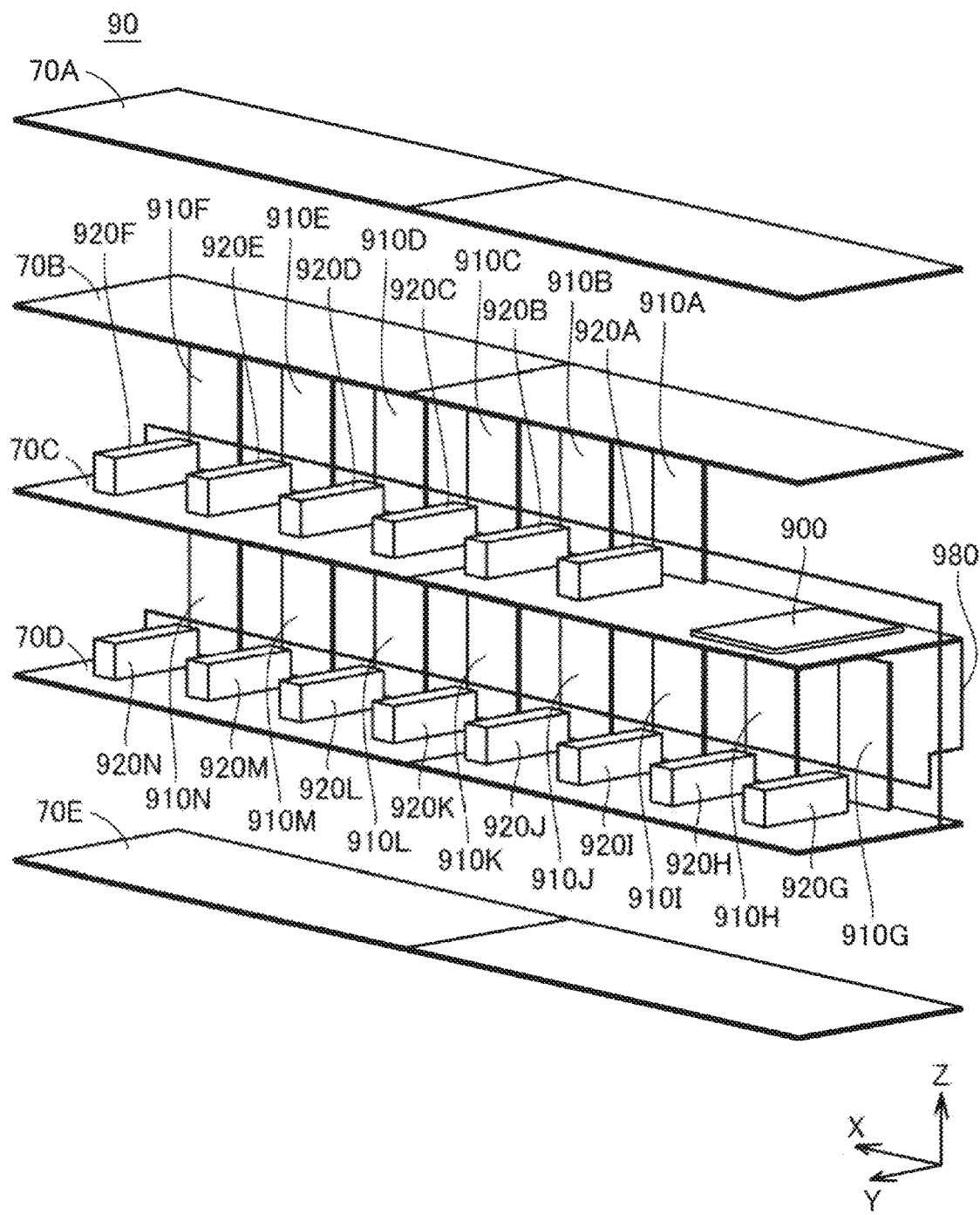
FIG. 21 is a first diagram showing an example of a model in which the SUs, the battery units, and a high-voltage line of the power supply device of the related art are disposed.
Figure 22:
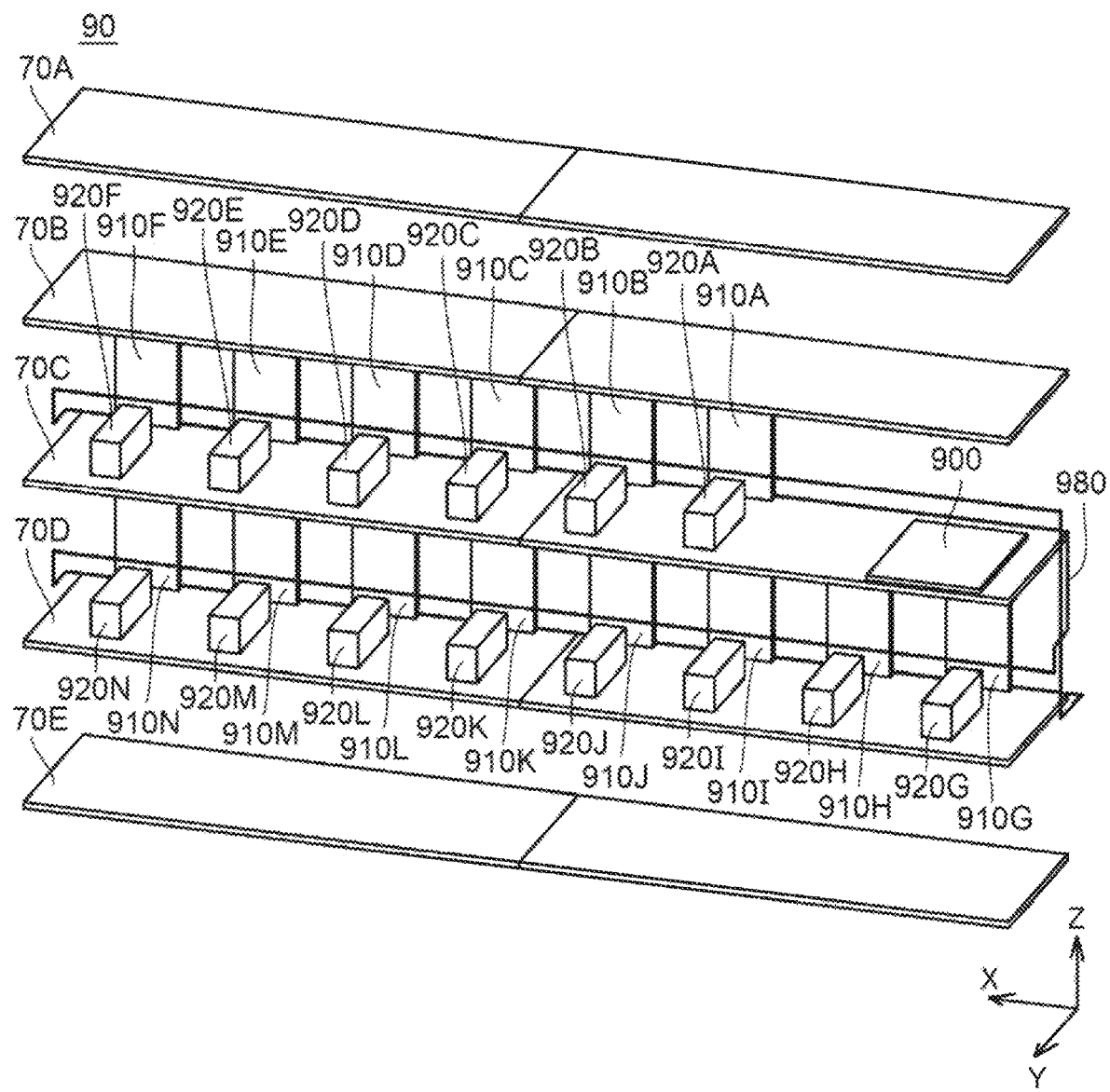
FIG. 22 is a second diagram showing an example of a model in which the SUs, the battery units, and the high-voltage line of the power supply device of the related art are disposed.

Next, the simulation results of the above-described embodiments will be described. FIG. 21 is a first diagram showing an example of a model in which the SUs 910A to 910N, the battery units 920A to 920N, and the high-voltage lines 980A to 980N and 980Y (hereinafter referred to as "high-voltage line 980") of the power supply device 90 of the related art are disposed. FIG. 22 is a second diagram showing an example of a model in which the SUs 910A to 910N, the battery units 920A to 920N, and the high-voltage line 980 of the power supply device 90 of the related art are disposed. A model in which the power supply device 90 described with reference to FIG. 1 is disposed on shelf boards 70A to 70E will be described with reference to FIGS. 21 and 22. The SCU 900, the SUs 910A to 910F, and the battery units 920A to 920F are disposed on the third shelf board 70C from the bottom as shown in the drawings. The SUs 910G to 910N and the battery units 920G to 920N are disposed on the second shelf board 70D from the bottom as shown in the drawings. The high-voltage line 980 is routed among the SUs 910A to 910N so as to establish the connection state shown in FIG. 1.

Figure 23:
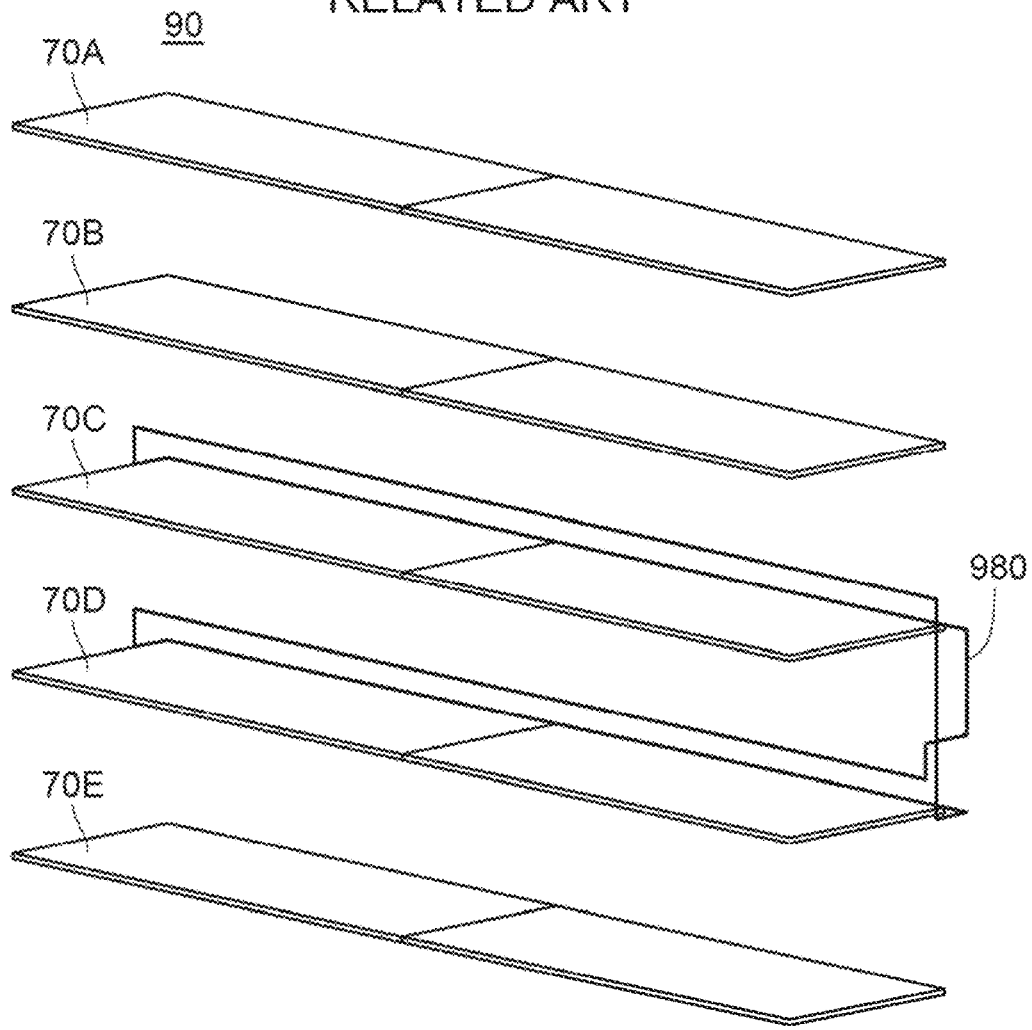
FIG. 23 is a diagram showing an example of a model in which the high-voltage line of the power supply device of the related art is disposed.
Figure 24:
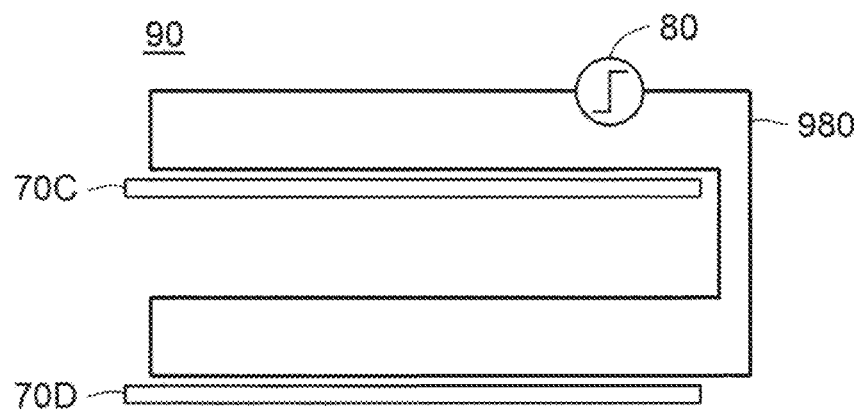
FIG. 24 is a schematic diagram showing an example of a model in which the high-voltage line of the power supply device of the related art is disposed, as viewed from the front.

FIG. 23 is a diagram showing an example of a model in which the high-voltage line 980 of the power supply device 90 of the related art is disposed. With reference to FIG. 23, FIG. 23 omits the SUs 910A to 910N and the battery units 920A to 920N from FIGS. 21 and 22. FIG. 24 is a schematic diagram showing an example of a model in which the high-voltage line 980 of the power supply device 9) of the related art is disposed, as viewed from the front (the front side of the drawing). With reference to FIG. 24, it is assumed that a current source 80 that generates simulation current flowing through the high-voltage line 980 is provided in the middle of the high-voltage line 980. The current source 80 generates current in which high-frequency current generated due to the period F of the gate signal and the delay time is superimposed on the current generated by the electric power output by the power supply device 90.

Figure 25:
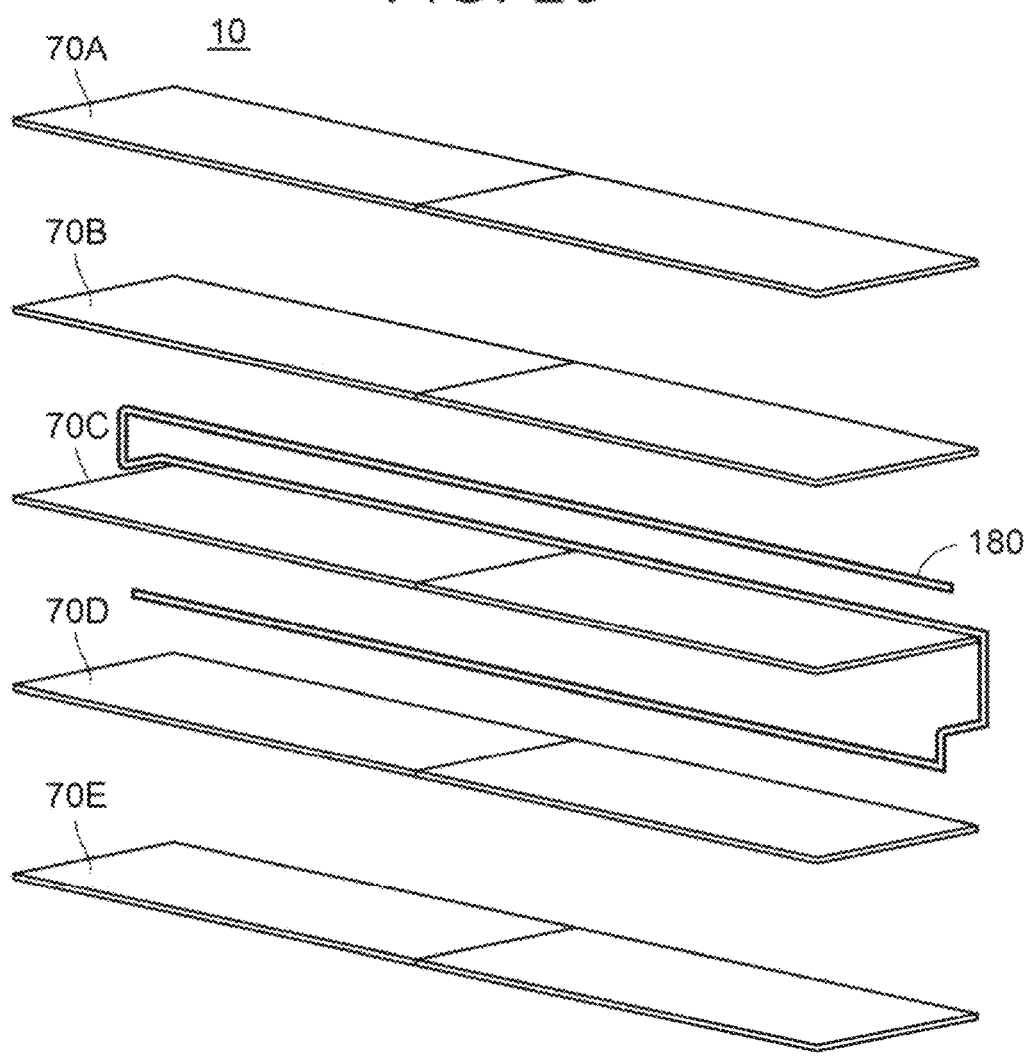
FIG. 25 is a diagram showing an example of a model in which the high-voltage line of the power supply device according to the fourth embodiment is disposed.

FIG. 25 is a diagram showing an example of a model in which the high-voltage lines 180A to 180N (hereinafter referred to as "high-voltage lines 180") of the power supply device 10 according to the fourth embodiment are disposed. With reference to FIG. 25, FIG. 25 is a diagram corresponding to FIG. 23 relating to the power supply device 90 of the related art. Specifically, the SCU 100, the SUs 110A to 110F, and the battery units 120A to 120F are disposed on the third shelf board 70C from the bottom. The SUs 110G to 110N and the battery units 120G to 120N are disposed on the second shelf board 70D from the bottom. The high-voltage line 180 is routed among the SUs 110A to 110N so as to establish the connection state shown in FIG. 10. FIG. 25 shows the state in which, from the configuration in which the SCU 100, the SUs 110A to 110N, the buttery units 120A to 120N, and the high-voltage line 180 are disposed, the components except for the high-voltage line 180 are omitted.

Figure 26:
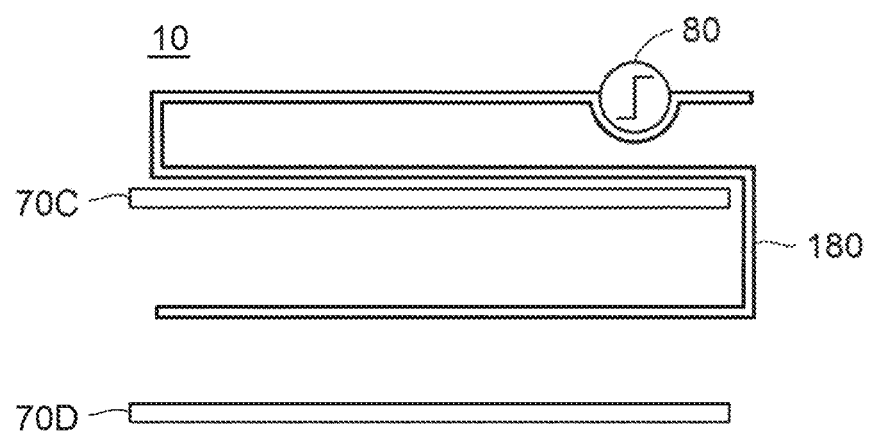
FIG. 26 is a schematic diagram showing an example of a model in which the high-voltage line of the power supply device according to the fourth embodiment is disposed, as viewed from the front.

FIG. 26 is a schematic diagram showing an example of a model in which the high-voltage line 180 of the power supply device 10 according to the fourth embodiment is disposed, as viewed from the front (the front side of the drawing). With reference to FIG. 26, it is assumed that the same current source 80 as in FIG. 24 is provided in the middle of the high-voltage line 180. The current source 80 generates current in which the high-frequency current generated due to the period F of the gate signal and the delay time is superimposed on the current generated by the electric power output by the power supply device 10.

Figure 27:
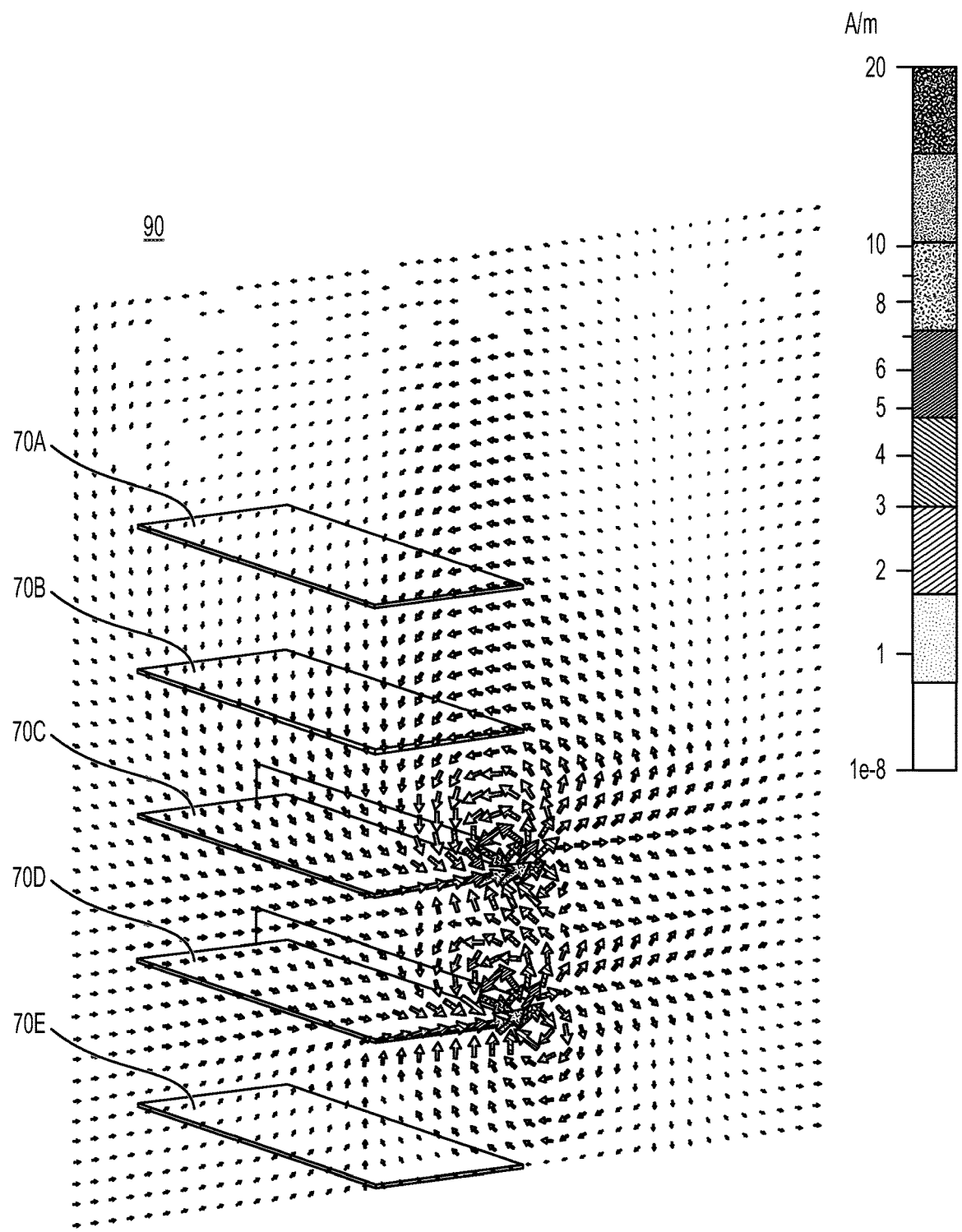
FIG. 27 is a diagram showing a magnetic field distribution by the high-voltage line of the power supply device of the related art.
Figure 28:
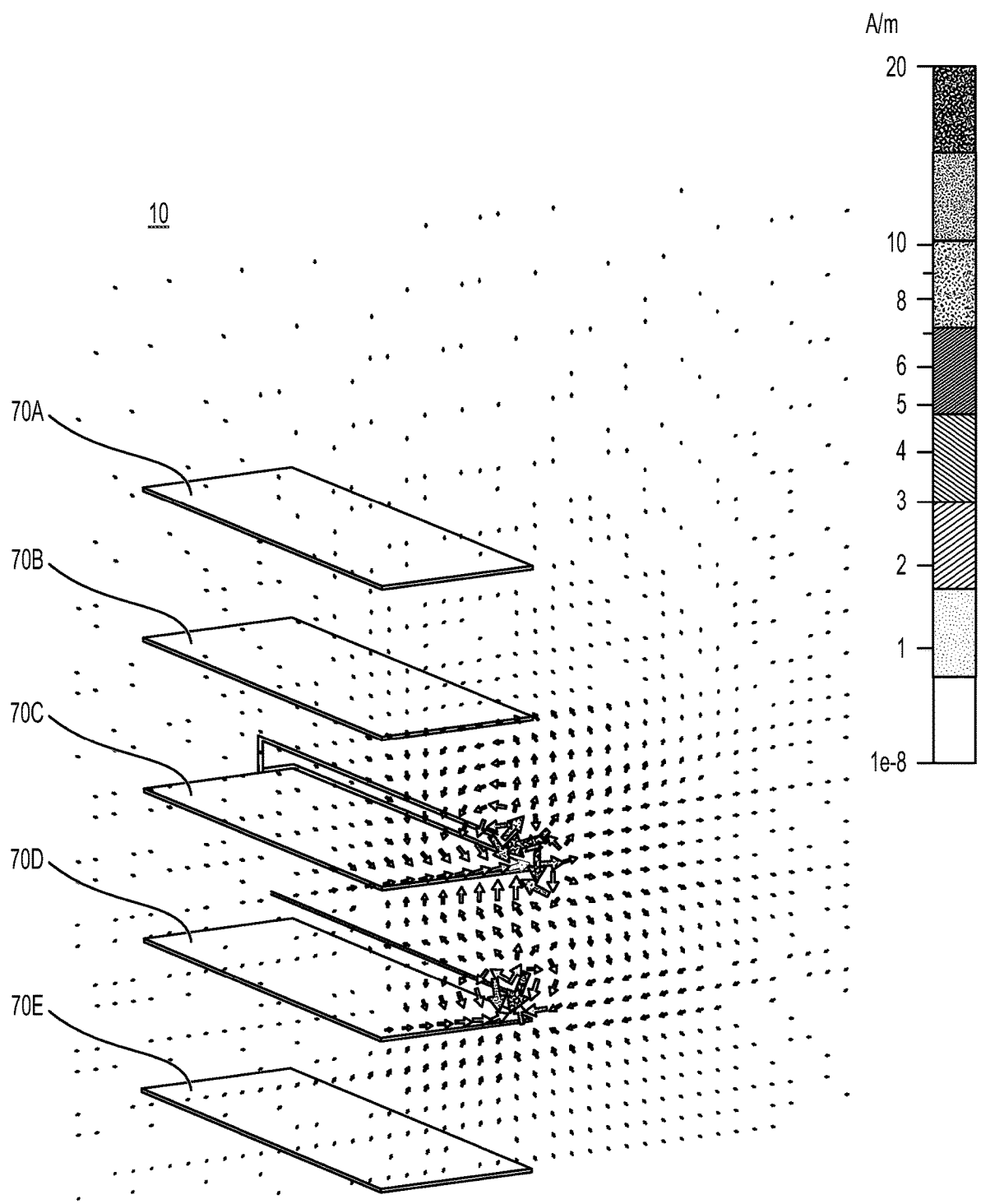
FIG. 28 is a diagram showing a magnetic field distribution by the high-voltage line of the power supply device according to the fourth embodiment.

FIG. 27 is a diagram showing a magnetic field distribution by the high-voltage line 980 of the power supply device 90 of the related art. FIG. 28 is a diagram showing a magnetic field distribution by the high-voltage line 180 of the power supply device 10 according to the fourth embodiment. In FIGS. 27 and 28, the directions of the arrows arranged in a grid indicate the directions of the magnetic field at the positions where the respective arrows are located, and the size and color intensity of each arrow indicate the strength of the magnetic field at the position where the arrow is located. As shown in FIGS. 27 and 28, the case where the two electric wires as the high-voltage line 180 are disposed side by side as in the fourth embodiment has a narrower range in which the strength of the magnetic field becomes relatively stronger and the overall strength of the magnetic field is weaker, as compared with the case of the related art where the electric wires as the high-voltage line 180 are not disposed side by side. The fourth embodiment has been shown as an example here. The same applies to the other embodiments.

Figure 29:
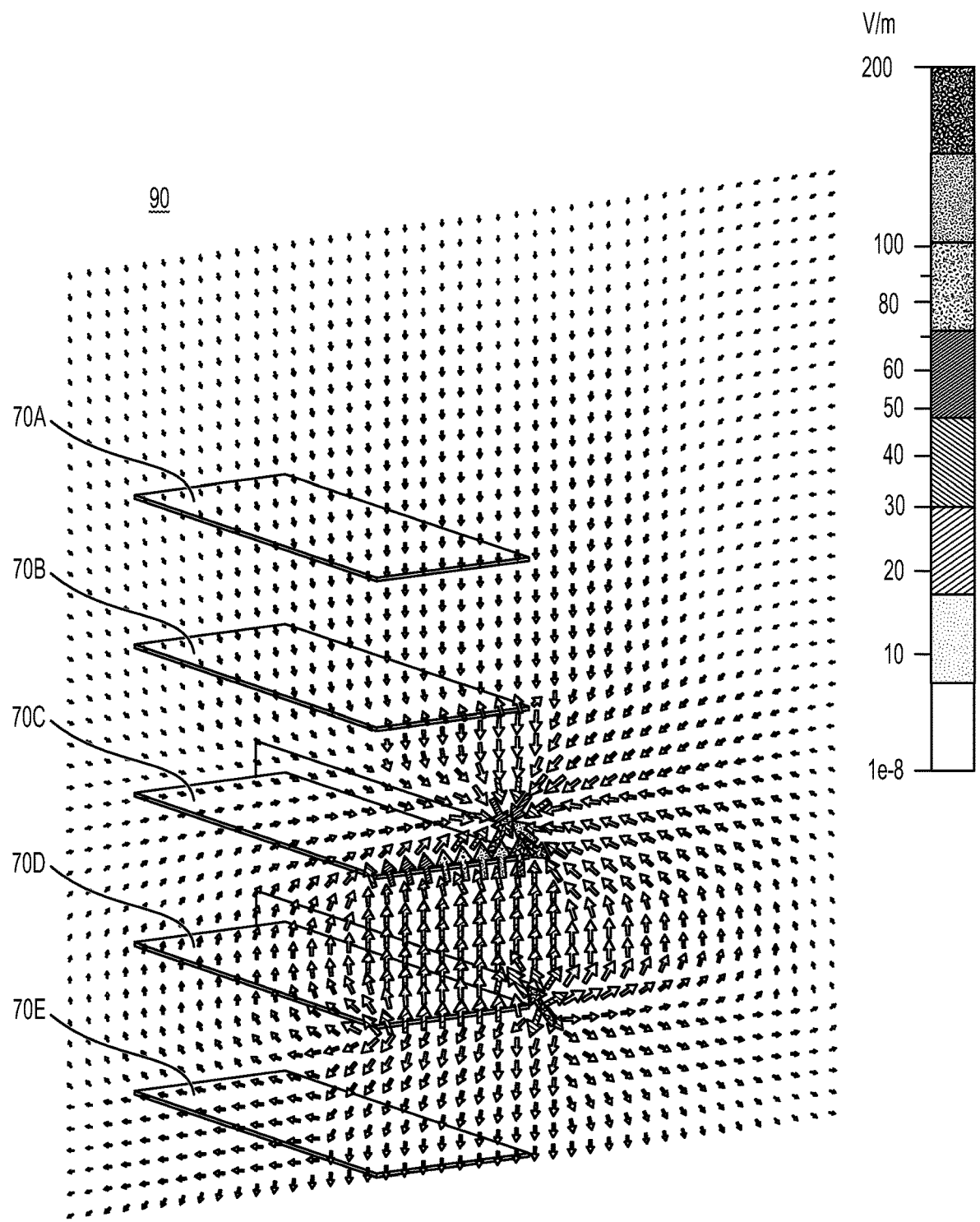
FIG. 29 is a diagram showing an electric field distribution by the high-voltage line of the power supply device of the related art.
Figure 30:
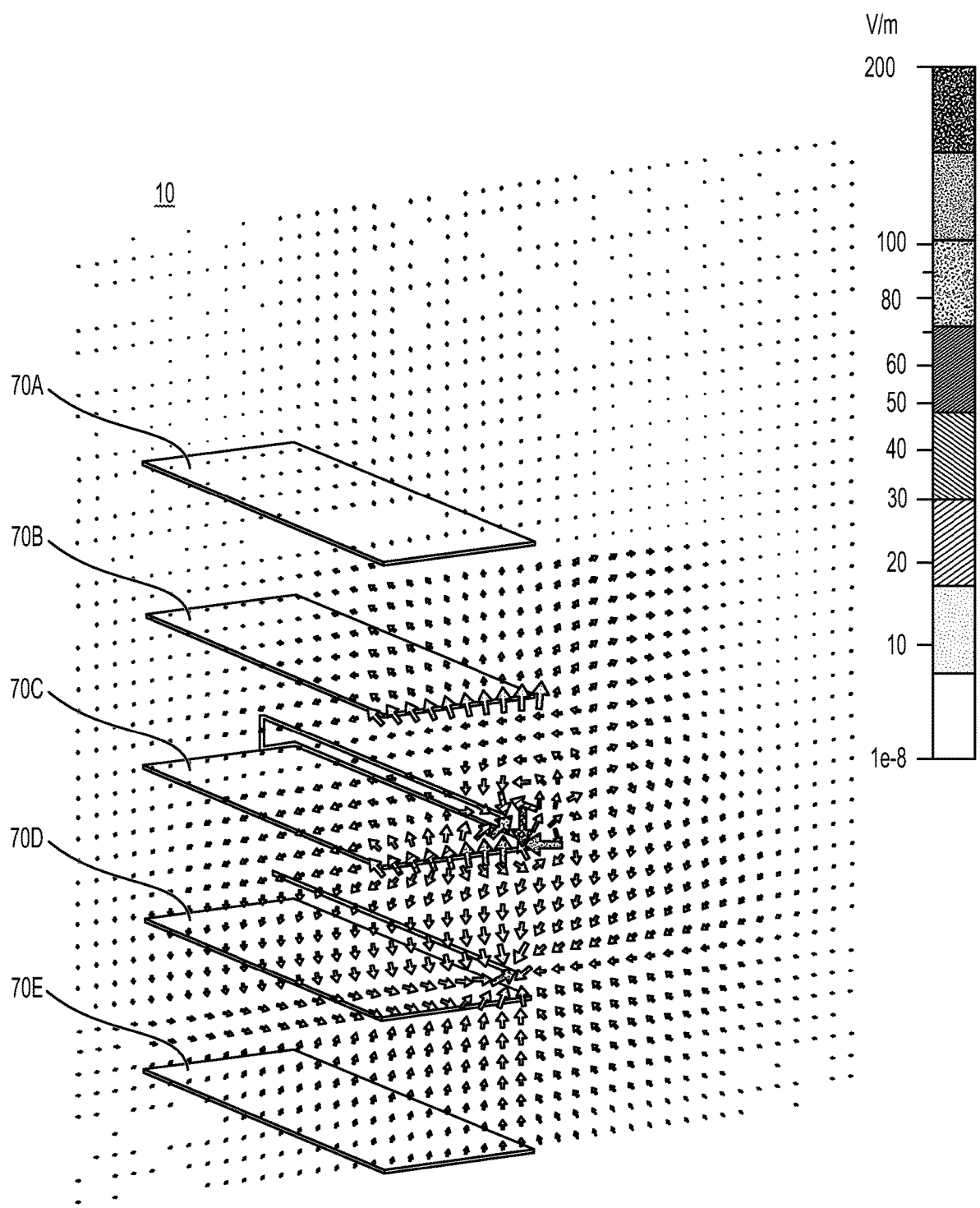
FIG. 30 is a diagram showing an electric field distribution by the high-voltage line of the power supply device according to the fourth embodiment.

FIG. 29 is a diagram showing an electric field distribution by the high-voltage line 980 of the power supply device 90 of the related art. FIG. 30 is a diagram showing an electric field distribution by the high-voltage line 180 of the power supply device 10 according to the fourth embodiment. In FIGS. 29 and 30, the directions of the arrows arranged in a grid indicate the directions of the electric field at the positions where the respective arrows are located, and the size and color intensity of each arrow indicate the strength of the electric field at the position where the arrow is located. As shown in FIGS. 29 and 30, the case where the two electric wires as the high-voltage line 180 are disposed side by side as in the fourth embodiment has a narrower range in which the strength of the electric field becomes relatively stronger and the overall strength of the electric field is weaker, as compared with the case of the related art where the two electric wires as the high-voltage line 180 are not disposed side by side. The fourth embodiment has been shown as an example here. The same applies to the other embodiments.

SUMMARY (1) As shown in FIGS. 5,7,8, 9 to 11, and 13 to 20, the power supply devices 10, 10A to 10C, and 20A to 20C can charge and discharge electric power. The high-voltage lines 180PA to 180PN, 280PA to 280PN, etc. (hereinafter referred to as "first high-voltage line") for exchanging the electric power externally, and the high-voltage lines 180NA to 180NN, 280N, etc. (hereinafter referred to as "second high-voltage line") for applying current flowing in the direction opposite to the first high-voltage lines while exchanging the electric power externally, a plurality of batteries 121A to 121N, etc. (hereinafter, simply referred to as "batteries"), a plurality of the SUs 110A to 110N, 210A to 210N, 1110A to 1110N (hereinafter, simply referred to as "SUs") that is provided corresponding to the batteries, switches the connection state of the batteries to the first high-voltage lines, and is disposed in a circle, and the SU 100 that controls the SUs.

As shown in FIGS. 2, 11, and 13 to 15, the SU can switch between a first state in which the battery corresponding to the SU is connected in series to the first high-voltage line and a second state in which the battery is not connected to the first high-voltage line. As shown in FIGS. 1 and 10, the SCU 100 controls the SUs to switch to the first state or the second state in accordance with the voltage of the electric power to be charged and discharged. One of the first high-voltage line and the second high-voltage line is disposed side by side with the other between the adjacent SUs.

With this configuration, one of the first high-voltage line and the second high-voltage line is set to be disposed side by side with the other between the adjacent SUs. For this reason, the closed loop surrounded by the power lines can be reduced as compared with the case where the adjacent SUs are connected to each other by only one power line of the outward path and the return path and the other power line extends along another path in which the other power line is not disposed side by side with the one power line, whereby the radiation can be reduced. As a result, the effect of radiation on the surroundings can be reduced.

(2) As shown in FIGS. 9 to 11, 16, 17, and 19, the adjacent SUs are connected by the first high-voltage line and the second high-voltage line. With this configuration, the area of the closed loop surrounded by the power lines can be further reduced as compared with the case where the adjacent SUs are connected by only either of the first high-voltage line or the second high-voltage line, whereby the radiation can be further be reduced. As a result, the effect of radiation on the surroundings can be further reduced.

(3) As shown in FIG. 11, the power supply devices 10, 10A to 10C, and 20A to 20C further include the high-voltage line 182A that connects the SU 110A and the positive electrode terminal 122PA of the battery 121A corresponding to the SU 110A, and the high-voltage line 183A that connects the SU 110A and the negative electrode terminal 122NA of the battery 121A corresponding to the SU 110A. The SU 110A further includes: the positive terminal 118PA for connecting the high-voltage line 180PA connected to the SU on one adjacent side; the negative terminal 118NA for connecting the high-voltage line 180PB connected to the SU on the other adjacent side; the battery positive electrode connection terminal 117PA for connecting the high-voltage line 182A connected to the corresponding battery 121A; the battery negative electrode connection terminal 117NA for connecting the high-voltage line 183A connected to the corresponding battery 121A; the first electric path that connects the positive terminal 118PA and the battery positive electrode connection terminal 117PA; the second electric path that connects the negative terminal 118NA and the battery negative electrode connection terminal 117NA; a bypass electric path that connects the positive terminal 118PA and the negative terminal 118NA without passing through the battery 121A; the first switching element 112A that is provided in the middle of the bypass electric path and opens and closes the bypass electric path; and the second switching element 113A that is provided in the middle of the first electric path or the second electric path and opens and closes the first electric path or the second electric path. As shown in FIGS. 13 to 15, the first state is a state in which the first switching element 112A is closed and the second switching element 113A is opened, and the second state is a state in which the first switching element 112A is opened and the second switching element 113A is closed.

With this configuration, the battery 121A can be connected in series or not connected to the high-voltage lines 180PA and 180PB by simply opening and closing the first switching element 112A and the second switching element 113A.

(4) As shown in FIG. 11, the SU 110A further includes: the return positive terminal 118PRA for connecting the high-voltage line 180NA connected to the SU on one adjacent side; the return negative terminal 118NRA for connecting the high-voltage line 180NB connected to the SU on the other adjacent side; and a return electric path that connects the return positive terminal 118PRA and the return negative terminal 118NRA.

With this configuration, the SU 110A including the first and second electric paths through which the current of the high-voltage lines 180PA and 180PB flows includes the return electric path through which the current of the high-voltage lines 180NA and 180NB flows. Therefore, the area of the closed loop can be further reduced, and the radiation can be further reduced. As a result, the effect of radiation on the surroundings can be further reduced.

(5) As shown in FIG. 11, the power supply devices 10, 10A to 10C further includes: the high-voltage line 182RA for applying current flowing in the direction opposite to the high-voltage line 182A; and the high-voltage line 183RA for applying current flowing in the direction opposite to the high-voltage line 183A. The high-voltage lines 182A and 182RA are disposed side by side with each other, and the high-voltage lines 183A, and 183RA are disposed side by side with each other.

With this configuration, the high-voltage line 182RA and the high-voltage line 183RA for applying current flowing in the opposite direction are connected in a state in which the high-voltage lines 182RA and 183RA are disposed side by side with the high-voltage line 182A and the high-voltage line 183A that connect the SU 110A and the battery 121A. Therefore, the area of the closed loop can be further reduced, and the radiation can be further reduced. As a result, the effect of radiation on the surroundings can be further reduced.

(6) As shown in FIG. 20, the high-voltage lines 182A and 182RA are configured by the shielded wire 182SA including the high-voltage lines 182A and 182RA as core wires. The high-voltage lines 183A and 183RA are configured by the shielded wire 183SA including the high-voltage lines 183A and 183RA as core wires. With this configuration, the shield of the shielded wires 182SA and 183SA serves as the return lines of the high-voltage lines 182A and 182RA and the high-voltage lines 183A and 183RA, whereby the common components of the high-voltage lines 182A and 182RA and the high-voltage lines 183A and 183RA can be returned to the ground. Therefore, the radiation can be further reduced. As a result, the effect of radiation on the surroundings can be further reduced.

The first power line and the second power line may be twisted together between the switching units adjacent to each other. With this configuration, the radiation can be further reduced. As a result, the effect of radiation on the surroundings can be further reduced.

(7) As shown in FIG. 17, the adjacent SUs may be connected by the return path lines 180RA to 180RN, in addition to the high-voltage lines 180PA to 180PN and the high-voltage lines 180NA to 180NN. With this configuration, the common components of the high-voltage lines 180PA to 180PN and the high-voltage lines 180NA to 180NN can be returned to the ground by the return path lines 180RA to 180RN. Therefore, the radiation can be further reduced. As a result, the effect of radiation on the surroundings can be further reduced.

(8) As shown in FIGS. 18 and 19, the adjacent SUs may be connected by the shielded wire 180S including the high-voltage lines 187 and 188 as core wires. With this configuration, the shield 189 of the shielded wire 18S serves as the return line of the high-voltage lines 187 and 188, whereby the common component of the high-voltage lines 187 and 188 can be returned to the ground. Therefore, the radiation can be further reduced. As a result, the effect of radiation on the surroundings can be further reduced.

What is claimed is:

1. A power supply device that is able to charge and discharge electric power, the power supply device comprising:
    a first power line for exchanging the electric power externally;
    a second power line applying current flowing in a direction opposite to the first power line while exchanging the electric power externally;
    a plurality of secondary batteries;
    a plurality of switching units, the switching units being provided corresponding to the respective secondary batteries, switching a connection state of the secondary batteries to the first power line, and being disposed in a circle;
    a plurality of positive electrode power lines that each connect a switching unit and a positive electrode terminal of the secondary battery corresponding to the switching unit;
    a plurality of negative electrode power lines that each connect the switching unit and a negative electrode terminal of the secondary battery corresponding to the switching unit; and
    a control device that controls the switching units, wherein:
    the switching units are each switchable between a first state in which the secondary battery corresponding to the switching unit is connected in series to the first power line and a second state in which the secondary battery is not connected to the first power line;
    the control device controls the switching units to switch to the first state or the second state in accordance with a voltage of the electric power to be charged and discharged;
    one of the first power line and the second power line is disposed side by side with the other between switching units adjacent to each other;
    the switching units adjacent to each other are connected by the first power line and the second power line;
    each of the switching units includes
        a one-side first terminal for connecting the first power line connected to the switching unit on one adjacent side,
        an another-side first terminal for connecting the first power line connected to the switching unit on another adjacent side,
        a positive electrode connection terminal for connecting a corresponding positive electrode power line connected to the corresponding secondary battery,
        a negative electrode connection terminal for connecting a corresponding negative electrode power line connected to the corresponding secondary battery,
        a first electric path that connects the one-side first terminal and the positive electrode connection terminal,
        a second electric path that connects the other-side first terminal and the negative electrode connection terminal,
        a bypass electric path that connects the one-side first terminal and the other-side first terminal without passing through the secondary battery,
        a first switching unit that is provided in the middle of the bypass electric path and opens and closes the bypass electric path, and
        a second switching unit that is provided in the middle of the first electric path or the second electric path and opens and closes the first electric path or the second electric path;
    the first state is a state in which the first switching unit is closed and the second switching unit is opened; and
    the second state is a state in which the first switching unit is opened and the second switching unit is closed.

2. The power supply device according to claim 1, wherein each of the switching units further includes:
    a one-side second terminal for connecting the second power line connected to the switching unit on the one adjacent side;

an another-side second terminal for connecting the second power line connected to the switching unit on another adjacent side; and a return electric path that connects the one-side second terminal and the other-side second terminal.

3. The power supply device according to claim 2, further comprising:

a plurality of positive electrode reverse power lines for applying current flowing in a direction opposite to the positive electrode power lines; and a plurality of negative electrode reverse power lines for applying current flowing in a direction opposite to the negative electrode power lines, wherein:

each of the positive electrode power lines is disposed side by side with a corresponding positive electrode reverse power line; and each of the negative electrode power lines is disposed side by side with a corresponding negative electrode reverse power line.

4. The power supply device according to claim 3, wherein the positive electrode power lines and the positive electrode reverse power lines are configured by shielded wires including the positive electrode power lines and the positive electrode reverse power lines as core wires.

5. The power supply device according to claim 1, wherein the first power line and the second power line are twisted together between the switching units adjacent to each other.

6. The power supply device according to claim 1, wherein the switching units adjacent to each other are connected by a return path line in addition to the first power line and the second power line.

7. The power supply device according to claim 1, wherein the switching units adjacent to each other are connected by a shielded wire including the first power line and the second power line as core wires.

* * * * *